United States Patent
Shilmover et al.

(10) Patent No.: US 10,216,531 B2
(45) Date of Patent: Feb. 26, 2019

(54) TECHNIQUES FOR VIRTUAL MACHINE SHIFTING

(71) Applicant: NETAPP, INC., Sunnyvale, CA (US)

(72) Inventors: Barry Shilmover, Issaquah, WA (US);
Akshay Deodhar, Sunnyvale, CA (US);
Dennis Ramdass, Sunnyvale, CA (US);
Glenn Sizemore, Raleigh, NC (US)

(73) Assignee: NETAPP, INC., Sunnyvale, CA (US)

( * ) Notice: Subject to any disclaimer, the term of this patent is extended or adjusted under 35 U.S.C. 154(b) by 216 days.

(21) Appl. No.: 14/530,135

(22) Filed: Oct. 31, 2014

(65) Prior Publication Data
US 2015/0324217 A1     Nov. 12, 2015

Related U.S. Application Data

(63) Continuation-in-part of application No. 14/503,338, filed on Sep. 30, 2014, which is a continuation-in-part of application No. 14/296,695, filed on Jun. 5, 2014.

(60) Provisional application No. 61/992,108, filed on May 12, 2014.

(51) Int. Cl.
G06F 9/46     (2006.01)
G06F 9/455     (2018.01)

(52) U.S. Cl.
CPC .. *G06F 9/45558* (2013.01); *G06F 2009/4557* (2013.01)

(58) Field of Classification Search
None
See application file for complete search history.

(56) References Cited

U.S. PATENT DOCUMENTS

| | | |
|---|---|---|
| 5,710,917 A | 1/1998 | Musa et al. |
| 5,819,292 A | 10/1998 | Hitz et al. |
| 6,131,192 A | 10/2000 | Henry |
| 6,857,001 B2 | 2/2005 | Hitz et al. |
| 7,107,385 B2 | 9/2006 | Rajan et al. |
| 7,409,494 B2 | 8/2008 | Edwards et al. |
| 7,577,722 B1 | 8/2009 | Khandekar et al. |
| 7,933,872 B2 | 4/2011 | Kulkarni et al. |
| 8,041,888 B2 | 10/2011 | Rajan et al. |
| 8,281,066 B1 | 10/2012 | Trimmer et al. |
| 8,332,847 B1 | 12/2012 | Hyser et al. |
| 8,352,608 B1 | 1/2013 | Keagy et al. |

(Continued)

OTHER PUBLICATIONS

Alvarez et al, Back to Basics: FlexClone, Tech on Tap, Apr. 2011, 12 pages.*

(Continued)

*Primary Examiner* — Diem K Cao
(74) *Attorney, Agent, or Firm* — Klein, O'Neill & Singh, LLP

(57) ABSTRACT

Techniques for virtual machine shifting are described. An apparatus may comprise shifting component operative to shift a virtual machine (VM) between a hypervisor having one type of hypervisor platform and a destination hypervisor having an alternative type of hypervisor platform through use of a clone of the VM. The shifting is bi-directional between the host and the destination hypervisor. The apparatus may comprise a universal application programming interface (API) used for reconfiguring one or more network interfaces and one or more disks of the VM onto the destination hypervisor. Other embodiments are described and claimed.

17 Claims, 24 Drawing Sheets

(56) References Cited

U.S. PATENT DOCUMENTS

| | | |
|---|---|---|
| 8,386,838 B1 | 2/2013 | Byan |
| 8,417,938 B1 | 4/2013 | Considine et al. |
| 8,443,365 B2 * | 5/2013 | Kumar ................ G06F 9/45558 714/1 |
| 8,458,717 B1 * | 6/2013 | Keagy ...................... G06F 8/63 718/104 |
| 8,688,636 B1 * | 4/2014 | Barve ..................... G06F 3/065 707/620 |
| 8,825,940 B1 | 9/2014 | Diggs |
| 8,826,033 B1 | 9/2014 | Krishnaprasad et al. |
| 9,146,769 B1 | 9/2015 | Shankar et al. |
| 9,177,337 B2 | 11/2015 | Hing |
| 2005/0216532 A1 | 9/2005 | Lallier |
| 2006/0089992 A1 | 4/2006 | Blaho |
| 2007/0171921 A1 * | 7/2007 | Wookey ................ G06F 3/1415 370/401 |
| 2007/0220248 A1 | 9/2007 | Bittlingmayer et al. |
| 2008/0235238 A1 | 9/2008 | Jalobeanu et al. |
| 2008/0263258 A1 | 10/2008 | Allwell et al. |
| 2009/0172664 A1 | 7/2009 | Mostafa |
| 2009/0228629 A1 | 9/2009 | Gebhart et al. |
| 2010/0070725 A1 | 3/2010 | Prahlad et al. |
| 2010/0250630 A1 | 9/2010 | Kudo |
| 2010/0257269 A1 | 10/2010 | Clark |
| 2010/0281467 A1 | 11/2010 | Arteaga et al. |
| 2010/0293349 A1 | 11/2010 | Lionetti et al. |
| 2011/0022694 A1 | 1/2011 | Dalal et al. |
| 2011/0078395 A1 | 3/2011 | Okada et al. |
| 2011/0107330 A1 | 5/2011 | Freundlich et al. |
| 2011/0126269 A1 | 5/2011 | Youngworth |
| 2011/0131524 A1 | 6/2011 | Chang et al. |
| 2011/0131576 A1 | 6/2011 | Ikegaya et al. |
| 2011/0307889 A1 | 12/2011 | Moriki et al. |
| 2012/0011193 A1 | 1/2012 | Gilboa |
| 2012/0011280 A1 | 1/2012 | Gilboa |
| 2012/0011445 A1 | 1/2012 | Gilboa |
| 2012/0030669 A1 | 2/2012 | Tsirkin |
| 2012/0110574 A1 * | 5/2012 | Kumar ................ G06F 9/45558 718/1 |
| 2012/0144391 A1 | 6/2012 | Ueda |
| 2012/0151476 A1 | 6/2012 | Vincent |
| 2012/0197772 A1 | 8/2012 | Hing |
| 2012/0221699 A1 | 8/2012 | Moriyasu et al. |
| 2012/0233282 A1 | 9/2012 | Voccio et al. |
| 2012/0278804 A1 | 11/2012 | Narayanasamy et al. |
| 2013/0014102 A1 | 1/2013 | Shah |
| 2013/0024722 A1 | 1/2013 | Kotagiri et al. |
| 2013/0139153 A1 | 5/2013 | Shah |
| 2013/0139155 A1 * | 5/2013 | Shah ................... G06F 9/45558 718/1 |
| 2013/0151802 A1 | 6/2013 | Bahadure et al. |
| 2013/0152078 A1 | 6/2013 | Arcilla et al. |
| 2013/0166504 A1 * | 6/2013 | Varkhedi ........... G06F 17/30581 707/610 |
| 2013/0185715 A1 | 7/2013 | Dunning et al. |
| 2013/0232474 A1 | 9/2013 | Leclair et al. |
| 2013/0247136 A1 | 9/2013 | Chieu et al. |
| 2013/0275596 A1 | 10/2013 | Subramaniam |
| 2013/0275971 A1 | 10/2013 | Kruglick |
| 2013/0297769 A1 * | 11/2013 | Chang ................ G06F 9/45558 709/224 |
| 2013/0326505 A1 | 12/2013 | Shah |
| 2013/0339645 A1 * | 12/2013 | Barve ..................... G06F 3/065 711/162 |
| 2013/0339956 A1 | 12/2013 | Murase et al. |
| 2013/0343385 A1 | 12/2013 | Benny et al. |
| 2014/0007092 A1 | 1/2014 | Barbee et al. |
| 2014/0007093 A1 | 1/2014 | Deshpande et al. |
| 2014/0032753 A1 | 1/2014 | Watanabe et al. |
| 2014/0075437 A1 | 3/2014 | Mousseau |
| 2014/0137114 A1 | 5/2014 | Bolte et al. |
| 2014/0149983 A1 | 5/2014 | Bonilla et al. |
| 2014/0165063 A1 | 6/2014 | Shiva et al. |
| 2014/0172406 A1 | 6/2014 | Baset et al. |
| 2014/0196030 A1 | 7/2014 | Deshpande et al. |
| 2014/0201732 A1 | 7/2014 | Haag et al. |
| 2014/0223435 A1 | 8/2014 | Chang |
| 2014/0245292 A1 | 8/2014 | Balani et al. |
| 2014/0281217 A1 | 9/2014 | Beam et al. |
| 2014/0282519 A1 | 9/2014 | Apte et al. |
| 2014/0344807 A1 | 11/2014 | Bursell et al. |
| 2014/0359610 A1 | 12/2014 | Tian et al. |
| 2015/0052521 A1 | 2/2015 | Raghu |
| 2015/0058382 A1 | 2/2015 | St. Laurent et al. |
| 2015/0106809 A1 | 4/2015 | Reddy et al. |
| 2015/0109923 A1 | 4/2015 | Hwang |
| 2015/0113530 A1 | 4/2015 | Arcese et al. |
| 2015/0113531 A1 | 4/2015 | Lv et al. |
| 2015/0134615 A1 | 5/2015 | Goodman et al. |
| 2015/0140974 A1 | 5/2015 | Liimatainen |
| 2015/0154039 A1 | 6/2015 | Zada et al. |
| 2015/0178113 A1 | 6/2015 | Dake |
| 2015/0178128 A1 * | 6/2015 | Knowles ................ G06F 9/461 718/1 |
| 2015/0242225 A1 | 8/2015 | Muller et al. |
| 2015/0254256 A1 * | 9/2015 | St. Laurent ....... G06F 17/30076 707/756 |
| 2015/0304343 A1 | 10/2015 | Cabrera et al. |
| 2015/0324216 A1 | 11/2015 | Sizemore et al. |
| 2015/0324217 A1 | 11/2015 | Shilmover et al. |
| 2015/0324227 A1 | 11/2015 | Sizemore |
| 2016/0019087 A1 | 1/2016 | Hing |
| 2016/0070623 A1 | 3/2016 | Derk et al. |
| 2016/0132400 A1 | 5/2016 | Pawar et al. |
| 2016/0241573 A1 | 8/2016 | Mixer |
| 2017/0168903 A1 | 6/2017 | Dornemann et al. |

OTHER PUBLICATIONS

Feresten et al, Back to Basics: NetApp Thin Provisioning, Tech on Tap, Oct. 2011, 8 pages.*
Bolosky et al, Single Instance Storage in Windows 2000, ACM, Aug. 2000, 12 pages.*
Microsoft Virtual Hard Disk Image Format Specification 1.0, Oct. 11, 2006, 17 pages.
Non-final Office Action dated Jun. 30, 2016 for U.S. Appl. No. 13/796,010.
Final Office Action dated Mar. 15, 2016 for U.S. Appl. No. 13/796,010.
Non-final Office Action dated Sep. 11, 2015 for U.S. Appl. No. 13/796,010.
Notice of Allowance dated Dec. 19, 2016 for U.S. Appl. No. 13/796,010, filed Mar. 12, 2013, 22 pages.
Whitehouse L., et al., "Amazon Web Services: Enabling Cost-Efficient Disaster Recovery Leveraging Cloud Infrastructure", Enterprise Strategy Group, White Paper, Jan. 2012, 16 pages.
Robinson G., et al., "Using Amazon Web Services for Disaster Recovery," Amazon Web Services, Oct. 2014, 22 pages.
Non-final Office Action dated Aug. 13, 2015 for U.S. Appl. No. 14/296,695, filed Jun. 5, 2015, 21 pages.
Non-final Office Action dated Feb. 9, 2016, for U.S. Appl. No. 14/296,695, filed Jun. 5, 2015, 26 pages.
Non-final Office Action dated Oct. 6, 2016 for U.S. Appl. No. 14/503,338.
Final Office Action dated Aug. 11, 2016 for U.S. Appl. No. 14/296,695.
Final Office Action dated May 4, 2017 for U.S. Appl. No. 14/503,338.
John J., "Top Three Things to Know Before you Migrate to Clustered Data ONTAP," Jul. 23, 2013, 5 pages.
Non-Final Office Action on co-pending U.S. Appl. No. 14/814,828 dated Jul. 13, 2016.
Notice of Allowance on co-pending U.S. Appl. No. 14/814,828 dated Feb. 1, 2017.
Non-Final Office Action on co-pending U.S. Appl. No. 14/712,845 dated Sep. 2, 2016.
Final Office Action on co-pending U.S. Appl. No. 14/712,845 dated Jan. 26, 2017.
Non-Final Office Action on co-pending U.S. Appl. No. 14/870,095 dated Oct. 25, 2016.

(56) References Cited

OTHER PUBLICATIONS

Notice of Allowance on co-pending U.S. Appl. No. 14/296,695 dated Jul. 25, 2017.
Final Office Action on co-pending U.S. Appl. No. 14/870,095 dated Jun. 1, 2017.
Non-Final Office Action on co-pending U.S. Appl. No. 14/928,158 dated Jun. 8, 2017.
Non-Final Office Action on co-pending U.S. Appl. No. 15/140,372 dated Sep. 8, 2017.
Non-Final Office Action on related U.S. Appl. No. 14/870,095 dated Jan. 10, 2018.
Notice of Allowance on co-pending U.S. Appl. No. 15/140,372 dated Oct. 6, 2017.
Notice of Allowance on related U.S. Appl. No. 14/712,845 dated Mar. 29, 2017.
Notice of Allowance on co-pending U.S. Appl. No. 14/503,338 dated Apr. 26, 2018.

* cited by examiner

400

BEGIN
402

SHIFTING A VIRTUAL MACHINE (VM) BETWEEN A HYPERVISOR HAVING ONE TYPE OF HYPERVISOR PLATFORM AND A DESTINATION HYPERVISOR HAVING A DIFFERENT TYPE OF HYPERVISOR PLATFORM THROUGH USE OF A CLONE OF THE VM
404

USE A UNIVERSAL APPLICATION PROGRAMMING INTERFACE (API) FOR RECONFIGURING ONE OR MORE NETWORK INTERFACES OF THE VM
406

END
408

*FIG. 4*

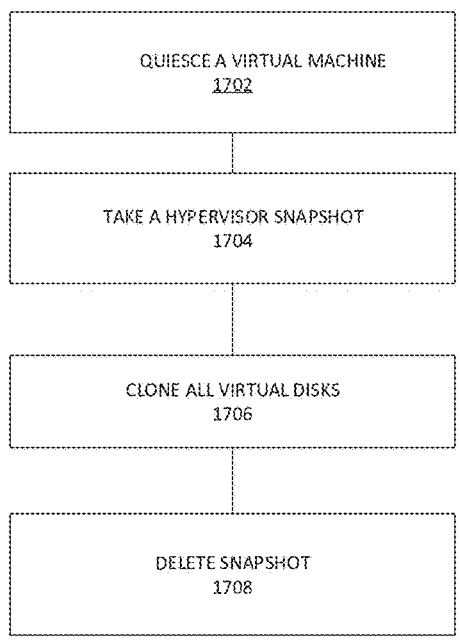
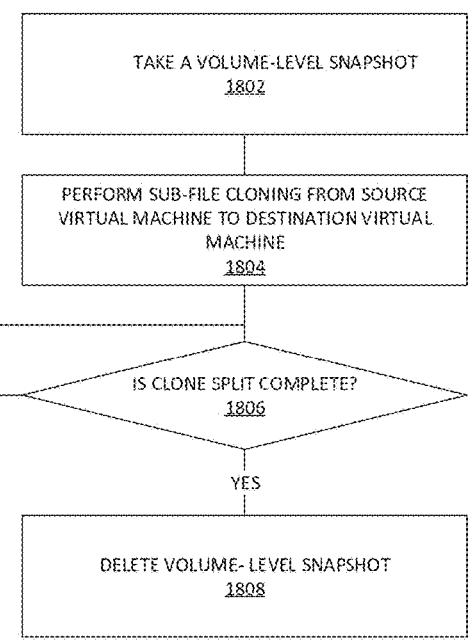
*FIG. 17*          *FIG. 18*

2100

Execute a first script in a guest operating system running on a source virtual machine, the first script collecting configuration information of the guest operating system.
2102

Generate a second script based on the collected configuration information.
2104

Execute the second script in the guest operating system running on a destination virtual machine, the second script reconfiguring the guest operating system to run on the destination virtual machine.
2106

*FIG. 21*

TECHNIQUES FOR VIRTUAL MACHINE SHIFTING

RELATED CASES

This application is a Continuation In Part of, claims the benefit of and priority to U.S. patent application Ser. No. 14/503,338, titled "Self-Repairing Configuration Service for Virtual Machine Migration," filed on Sep. 30, 2014, which is a Continuation In Part of, claims the benefit of and priority to U.S. patent application Ser. No. 14/296,695, titled "Techniques for Virtual Machine Migration," filed on Jun. 5, 2014, which claims the benefit of priority under 35 U.S.C. § 119(e) to U.S. Provisional Patent Application No. 61/992,108, filed on May 12, 2014, all of which are hereby incorporated by reference in their entirety.

This application is related to commonly-owned U.S. patent application Ser. No. 13/796,010, titled "Technique for Rapidly Converting Between Storage Representations in a Virtualized Computing Environment," filed on Mar. 12, 2013, which is hereby incorporated by reference in its entirety.

BACKGROUND

A virtual machine (VM) is a software implementation of a machine, such as a computer, that executes programs like a physical machine. A VM allows multiple operating systems to co-exist on a same hardware platform in strong isolation from each other, utilize different instruction set architectures, and facilitate high-availability and disaster recovery operations. Migrating data between VM architectures, however, may be problematic, particularly when migrating from one hypervisor platform to another type of hypervisor platform. For instance, migration may cause a disruption in services, lengthy migration times, or in some cases lead to data corruption.

BRIEF DESCRIPTION OF THE DRAWINGS

FIG. 4 illustrates an embodiment of an overall logic flow for shifting the virtual machine migration system of FIG. 1.

FIG. 17 illustrates an embodiment of a detailed logic flow for a backup operation.

FIG. 18 illustrates an embodiment of a detailed logic flow for sub-file cloning.

FIG. 21 illustrates an embodiment of a logic flow for the virtual machine migration system of FIG. 1.

DETAILED DESCRIPTION

Figure 1:
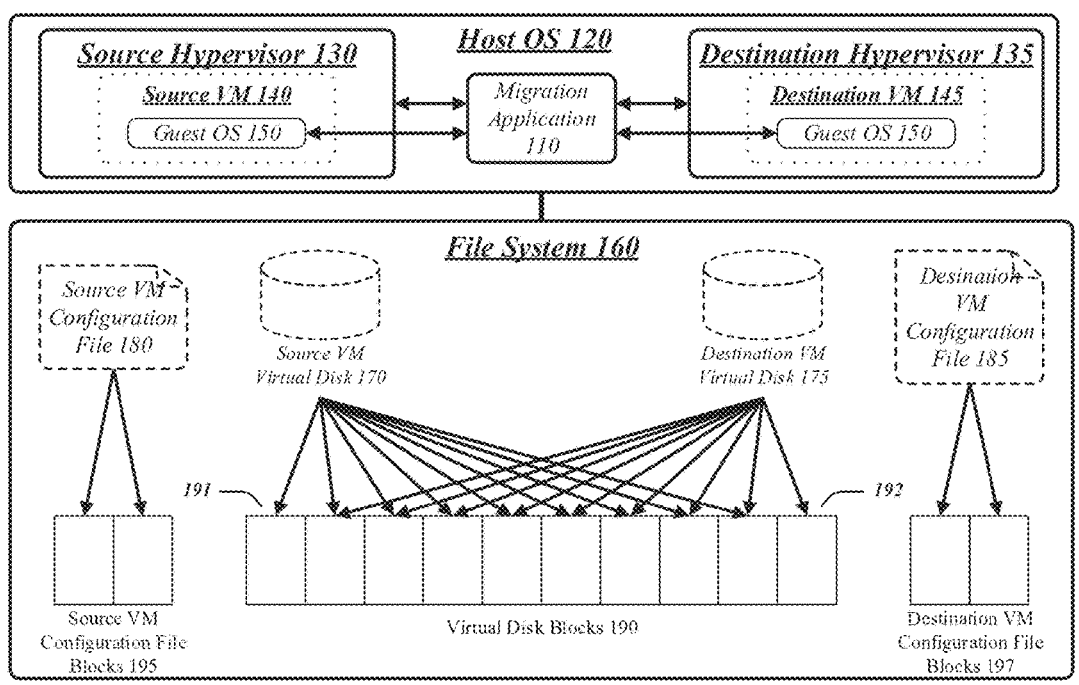
FIG. 1 illustrates an embodiment of a virtual machine migration system.

Various embodiments are generally directed to techniques for virtual machine shifting. Some embodiments are particularly directed to techniques for automated virtual machine shifting that is either fully-automated or makes use of only minimal human interaction, limited to, for example, bridging physical isolation or logical separation between a virtual machine environment and a control system.

Various embodiments are directed to techniques for virtual machine shifting. A guest operating system (OS) runs on top of an execution environment platform known as the virtual machine (VM), which abstracts a hardware platform from the perspective of the guest OS. The hardware abstraction is performed by a hypervisor, also known as a VM monitor, which runs as a piece of software on the host OS. The host OS typically runs on an actual hardware platform, though multiple tiers of abstraction may be possible. While the actions of the guest OS are performed using the actual hardware platform, access to this platform is mediated by the hypervisor. For instance, virtual network interfaces may be presented to the guest OS that present the actual network interfaces of the base hardware platform through an intermediary software layer. The processes of the guest OS and its guest applications may execute their code directly on the processors of the base hardware platform, but under the management of the hypervisor.

Multiple vendors provide hypervisors for the execution of virtual machines using abstraction technology unique to the vendor's implementation. The vendors use technology selected according to their own development process. However these are frequently different from vendor to vendor. Consequently, the guest OS has tailored virtual hardware and drivers to support the vendor implementation. This variation may lead to a core incompatibility between VM platforms. For example, different VM platforms may use different technologies for bridging to a network, where virtualized network interfaces are presented to the guest OS. Similarly, different VM platforms may use different formats for arranging the data stored in virtual disks onto actual storage hardware. As such, migrating a guest OS from one VM platform to another may require reconfiguration of the guest OS and modification of files stored on the host OS that are referenced by the hypervisor. Performing this reconfiguration and modification may improve the affordability and practicality of transitioning a virtual machine between VM platforms.

The hypervisor may be configured to manage hardware resources of, for example, a host device within a data center environment, such as a cloud computing data center environment, so that multiple virtual resources may operate concurrently at the host device. Within a relatively large-scale infrastructure of a data center environment, several incompatible hypervisors may be operating within different host devices of the data center environment. Hypervisors may be incompatible because they have different hypervisor platforms, such as a VMware® hypervisor and a Microsoft® Hyper-V™ hypervisor. Accordingly, a need exists for enabling virtual machines to be shifted on incompatible hypervisors. The shifting should allow for bi-directional shifting between a hypervisor having one type of hypervisor platform and another hypervisor having an alternative type of hypervisor. The bi-directional shifting between incompatible hypervisors increases computing efficiency.

In various embodiments, bi-directional shifting of a virtual machine between incompatible hypervisors may be accomplished using a single instance storage (SIS) clone provided by an operating system, such as NetApp® Data ONTAP™. The SIS clone may be a read-only and/or a read-write clone. A single instance storage replaces duplicate files with logical lings that point to a single copy of the file in a SIS common store, which is a hidden folder located in a root directory of a volume. The SIS clone reduces the amount of disk space that is need to store The sis-clone functionality may be used to create a rapid clone of the virtual machine (VM) to be shifted between incompatible hypervisor platforms. It should be noted that "sis: stands for single instance storage. It is also known as de-duplication which is an operation for preventing duplicate copies of the same data being stored over and over. Thus, a sis-clone is a clone copy of the original data which is done efficiently at the storage block level by starting out sharing the underlying blocks for a source and a copy and creating new blocks as they diverge between the source and destination. The cloning operation may be part of the migration operations of the virtual machine. The storage system operating system provides the capability to perform a rapid clone of the VM to be shifted.

Rapid cloning of virtual machines may be performed by receiving a request to clone a source data object, such as a virtual machine. A source Nock range of the source data object in a source logical storage unit is determined. An empty data object in the destination logical storage unit is created. A destination Nock range of the empty data object in the destination logical storage unit is determined. The source block range is mapped to the destination block range. The source data object is cloned based on the mapping. By leveraging and using sis-clone functionality for the rapid cloning of the virtual machine, other data ONTAP capabilities may be leveraged to facilitate a rapid shifting of data and the virtual machine. For example, the data ONTAP capabilities include de-duplication and data compression.

It may be of particular value to perform virtual machine shifting without the installation of additional software tools, besides those that may be used for integration of a guest OS with the VM platform. For instance, the migration and shifting process may include the installation of integration tools, including drivers that provide support for the virtualized hardware devices of the destination VM platform to the guest OS. It should be notated that the terms "migrating" and "shifting" may be used interchangeably. However, the migration itself may be performed entirely through scripts executed in the guest OS and remote commands from an external migration application, the migration application running on the host OS without virtual machine mediation. Avoiding the installation of migration tools within the guest OS may increase the dependability of the migration process, reduce the footprint of the software used for the migration, and reduce the time used for the migration process, thereby reducing the downtime for the guest OS and any services it may host.

A universal application interface (API) may be used with the shifting reconfiguring one or more network interfaces and one or more disks of the VM onto the destination hypervisor. The universal API may be an API and/or Command Line Interface (CLI) layer offered by the guest OS being converted. The universal API may include underlying Window® Win32® APIs or Unix system commands in devices and/or network configurations.

The universal API provides easy use for users and $3^{rd}$ party applications having highly customized workflows for shifting the VM. As such, as described herein, the bi-directional shifting of the virtual machines between incompatible hypervisor platforms by leveraging a rapid clone created of the VM results in a virtual machine that boots up on the destination hypervisor with no data loss with properly installed network configurations, drive letter mapping, and properly functioning application operations.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a virtual machine migration system 100. In one embodiment, the virtual machine migration system 100 may comprise a computer-implemented system having a software migration application 110 comprising one or more components. Although the virtual machine migration system 100 shown in FIG. 1 has a limited number of elements in a certain topology, it may be appreciated that the virtual machine migration system 100 may include more or less elements in alternate topologies as desired for a given implementation.

It is worthy to note that "a" and "b" and "c" and similar designators as used herein are intended to be variables representing any positive integer. Thus, for example, if an implementation sets a value for a=5, then a complete set of components 122-a may include components 122-1, 122-2, 122-3, 122-4 and 122-5. The embodiments are not limited in this context.

The virtual machine migration system 100 may comprise the migration application 110. The migration application 110 may be generally arranged to migrate guest OS 150 from source VM 140 running on source hypervisor 130 to destination VM 145 running on destination hypervisor 135, wherein each of migration application 110, source hypervisor 130, and destination hypervisor 135 all run on top of host OS 120.

File system 160 may store various files used in the operation of source VM 140 and destination VM 145, and thereby the operation of guest OS 140. File system 160 may store various files used by migration application 110. File system 160 may store various files used by the host OS 120. File system 160 may be provided by host OS 120 or may be a third-party file system working in conjunction by host OS 120. File system 160 may be a local file system, a network-accessible file system, a distributed file system, or use any other file system techniques for the storage of, maintenance of, and access to files.

File system 160 may store source VM configuration file 180 used by source hypervisor 130 for the determination of various configurations of source VM 140. File system 160 may store destination VM configuration file 185 used by the destination hypervisor 135 for the determination of various configurations of source VM 140. The source VM configuration file 180 may be composed of one or more source VM configuration file blocks 195. Destination VM configuration file 185 may be composed of one or more destination VM configuration file blocks 197. The configuration of a virtual machine may comprise, among other elements, specifying the configuration of the hardware platform to be virtualized, such as number and type of CPU, memory size, disk size, etc.

Guest OS 150 may be presented a virtual disk by the virtual machines, the virtual disk an abstraction of the physical storage used by the virtual machines. File system 160 may store source VM virtual disk 170, where source VM virtual disk 170 is an arrangement of blocks corresponding to a virtual disk format used by the source hypervisor 130. File system 160 may store destination VM virtual disk 175, where destination VM virtual disk 175 is an arrangement of blocks corresponding to a virtual disk format used by the destination hypervisor 135. Virtual disk blocks 190 is the joint collection of blocks used by both source VM virtual disk 170 and destination VM virtual disk 175. Source VM virtual disk 170 and destination VM virtual disk 175 may be able to be built from almost entirely the same set of blocks, with the common blocks being those that correspond to the storage of data visible to the guest OS 150. Each of the source VM virtual disk 170 and destination VM virtual disk 175 may have one or more blocks dedicated to storage of data and metadata used by the source hypervisor 130 and destination hypervisor 135, respectively, that is not accessible to the guest OS 150. For example, block 191 may be exclusively used by source hypervisor 130 for storing data and metadata used for managing its access to the common blocks of virtual disk blocks 190. Similarly, block 192 may be exclusively used by destination hypervisor 135 for storing data and metadata used for managing its access to the common blocks of virtual disk blocks 190. It will be appreciated that multiple blocks may be used by either or both of source hypervisor 130 and destination hypervisor 135 for the storage of this data and metadata. Because of this overlap in storage blocks transitioning from source hypervisor 130 to destination hypervisor 135 may involve simply creating block 192, with its data and metadata for managing the common blocks, and constructing destination VM virtual disk 175 from those blocks used by source VM virtual disk 170 that are not exclusive to the management data and metadata of source hypervisor 130.

The migration application 110 may interact with the source hypervisor 130, the destination hypervisor 135, the guest OS 150, and the file system 160 to migrate the guest OS 150 from the source hypervisor 130 to the destination hypervisor 135. The migration application 110 may generate one or more scripts that run in the guest OS 150 running on top of each of the source VM 140 and the destination VM 145 to perform the migration. The migration application 110 may use one or more scripts that run in the guest OS 150 on top of the source VM 140 to gather configuration information for use in generation of one or more scripts that run in the guest OS 150 on top of destination VM 145. The migration application 110 may send commands to and monitor the source hypervisor 130 and destination hypervisor 135. For instance, the migration application 110 may script or use direct commands to initiate power cycles of the virtual machines and use the power cycling of virtual machines to monitor the progress of scripts. By using scripts that use the built-in scripting of the guest OS 150 the migration application 110 may avoid installing software agents within the guest OS 150 for performing the migration, thereby simplifying the migration process.

Figure 2:
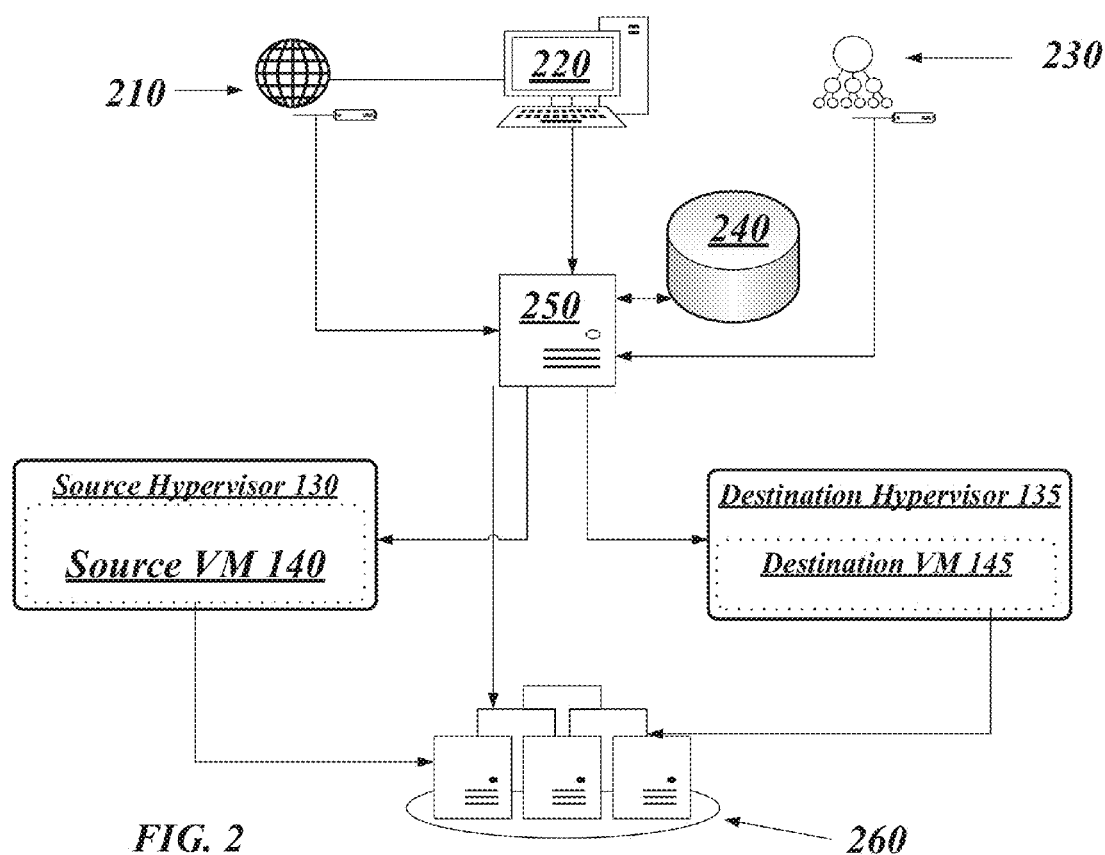
FIG. 2 illustrates an embodiment for shifting virtual machines between hypervisors having different hypervisor platforms for the virtual machine migration system of FIG. 1.

FIG. 2 illustrates an embodiment for shifting virtual machines between hypervisors having incompatible hypervisor platforms for the virtual machine migration system of FIG. 1. In one embodiment, the virtual machine migration system 100 may comprise a computer-implemented system having a software migration application 110 comprising one or more components. A shift server 250, with an associated database 240, is in communication with a web client 210 having storage management functionality, such as a NetApp® SnapManager® software, which is part of the NetApp OnCommand™ management software, for working with enterprise applications. The shift server 250 may also be referenced as a "shift component" and/or the entire virtual machine migration system 100 may be considered the shift component. The shift server 250 is also in direct communication with a command line interface 230 (or "API client") 230. In one embodiment, a Representational State Transfer (REST) Application Programming Interfaces (API) 306 is a proprietary API that is part of the Shift server 250. A command line interface 230 (or "API client") invokes the REST APIs 306 exposed in Shift server 250 to perform different pre-migration, migration and post-migration activities. The universal API may be an API and/or Command Line Interface (CLI) layer offered by the guest OS being converted.

The shift server 250 is also in communication with source hypervisor 130 having one type of hypervisor platform and the destination hypervisor 135 having an alternative type of hypervisor platform. For example, the source hypervisor 130 may be a VMware® host platform environment allowing the source virtual machine 140 to utilize a VMware® virtual machine format, and alternatively, the destination hypervisor 135 may be a Microsoft® Hyper-V™ host platform environment allowing the destination virtual machine 145 to utilize a Microsoft® Hyper-V™ virtual machine format. A storage system 260, such as a cloud based storage system, provides storage for the shift server 250, the source hypervisor 130, and the destination hypervisor 135.

Figure 3:
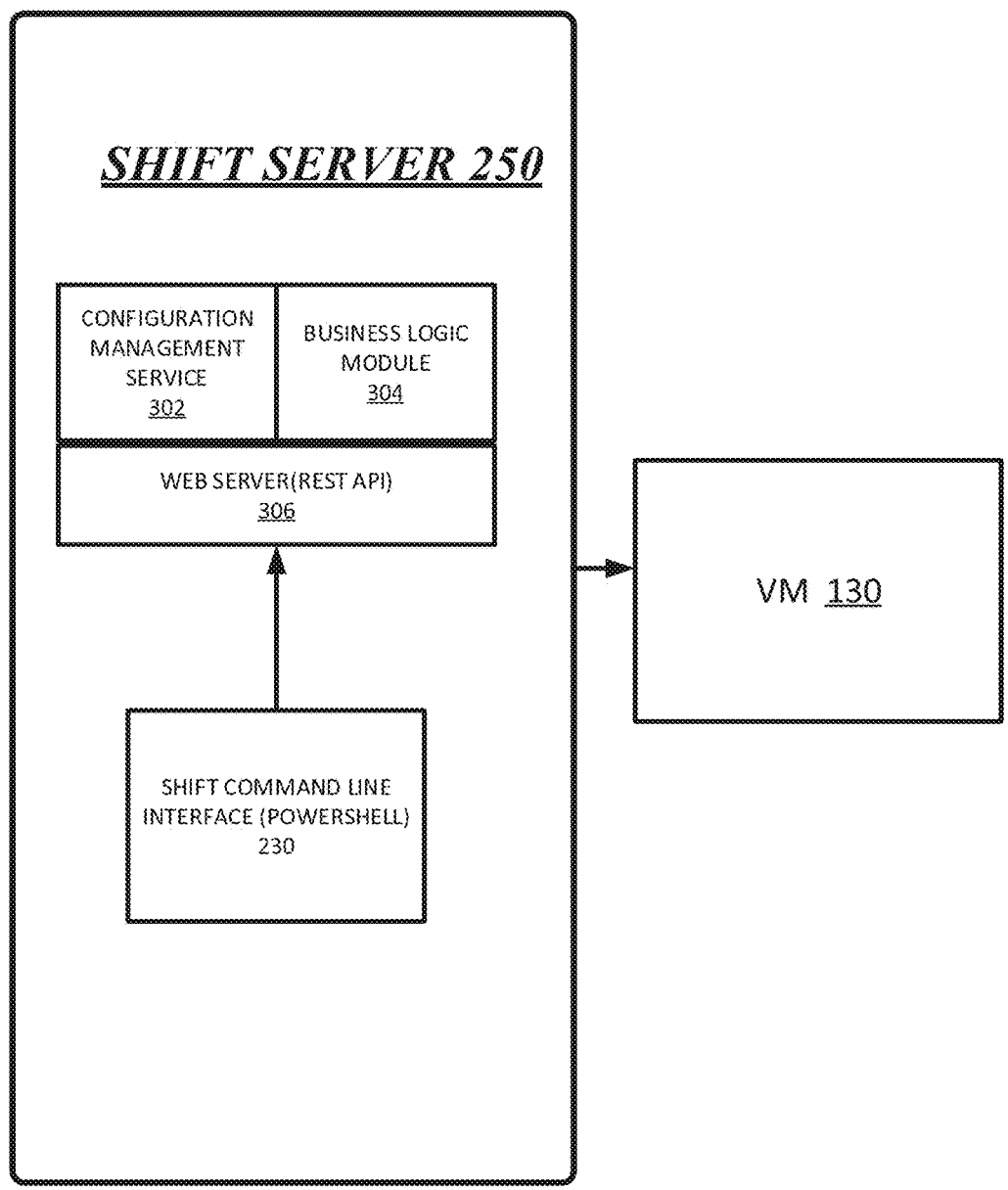
FIG. 3 illustrates an embodiment of a shift server system of FIG. 2.

FIG. 3 illustrates an embodiment of a shift server system of FIG. 2. The shift server 250 provides the key interfaces and functionality to shifting the virtual machines across incompatible hypervisors, such as shifting the source VM 140 located on the source hypervisor 130 onto the destination VM 145 on the destination hypervisor 135. Also, the shift server 250 provides a web server 306, which includes the REST API 306, configuration management services 302, and necessary business logic from a business logic module 304.

For example, the web server 306 exposes a universal API, such as a REST API, which may be invoked by a command line interface 230. The universal API implements granular interfaces to perform a variety of operations, such as storage configuration, hypervisor configuration, and VM migration. The configuration management service 302 provides an abstraction to manage heterogeneous configuration information, which includes storage system information, hypervisor information, and cloud storage system provider endpoint information. The configuration management service 302 provides persistence for configuration information to guard against an application crash or server reboot. The configuration management service 302 may use an extensible markup language (XML) based file, which may evolve to a database (DB), if necessary. The business logic includes a business layer that contains classes and utility functions that assist in the VM shifting functionality. The business layer will contain logic to establish connection to storage systems 260, hypervisors 130, 135, by using facades. The shift server 250 will contain utility functions that perform hypervisor specific operations. In addition, the business layer will host the core VM shifting logic, including conversion from one disk format to another.

The virtual machines, such as the source virtual machine, may include operations that assist in the shifting functionality. For example, the shift server 250 may assist in collecting network configuration information on the guest OS 150 of the virtual machine. This collection operation includes collecting network adapter information that needs to be backed up prior to virtual machine conversion. The shift server 250 may assist with backup information related to drive letter mapping and mounting. For example, the shift server 250 may collect such network configuration information from outside a virtual machine. In an alternative operation, the network configuration information and drive mapping data collection may offloaded, or dumped, onto the shift server 250. The shift server 250, either independently or with the assistance of the VM 130 may store the information before shifting, then remove network adapters from the VM, perform the conversion, and then re-create the network adapters with the backed up configuration information.

The command line interface 230 provides a command-line interface to perform the virtual machine migrations. The command line interface 230 may be exposed as a suite of object driven shell commands code, such as PowerShell™ cmdlets code for performing granular operations. In one embodiment, the command line interface 230 commands would be configuring a source hypervisor 130, configuring a destination hypervisor 135, shifting a virtual machine 140, providing a list of virtual machines, and shift multiple virtual machines.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 4 illustrates an embodiment of an overall logic flow 400 for the virtual machine migration system of FIG. 1. The logic flow 400 may be representative of some or all of the operations executed by one or more embodiments described herein. The logic flow 400 may be an overall logic flow for the virtual machine migration system 100, presenting a high-level view of the workflow of the shifting process.

In the illustrated embodiment shown in FIG. 4, the logic flow 400 may begin at block 402. The logic flow 400 may shift a virtual machine between a hypervisor having one type of hypervisor platform and a destination hypervisor having a different type of hypervisor platform through use of a rapid clone created of the virtual machine at block 1220. A universal application-programming interface (API) is used for reconfiguring one or more network interface of the virtual machine at block 406. The logic flow 400 ends at block 408.

Figure 5:
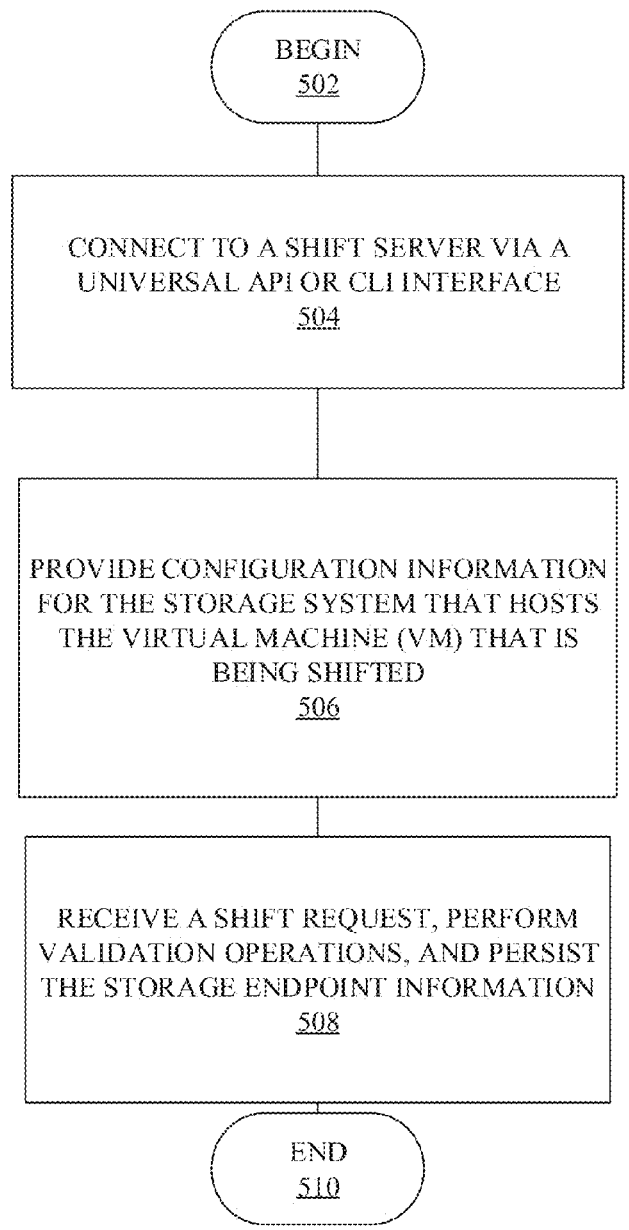
FIG. 5 illustrates an embodiment of an overall logic flow for adding a storage system to a shift server of the virtual machine migration system of FIG. 1.

FIG. 5 illustrates an embodiment of an overall logic flow 500 for adding a storage system to a shift server of the virtual machine migration system of FIG. 1. The logic flow 500 may be representative of some or all of the operations executed by one or more embodiments described herein. The logic flow 500 may be an overall logic flow for the virtual machine migration system 100, presenting a high-level view of the workflow of the migration process.

In the illustrated embodiment shown in FIG. 5, the logic flow 500 may begin at block 502. The logic flow 500 may connect to a shift server 250 via a universal API or client interface 230 at block 504. For example, a storage administrator connects to the shift server 250 via the REST API 306 or CLI interface 230.

Configuration information of the virtual machine is provided for the storage system that hosts the VMs 140, 145 being shifted at block 506. Cluster level credentials may be used as part of the configuration information. For example, the storage administrator provides and inputs the configuration information for the storage system and includes cluster level credentials. This configuration information may include name/internet protocol (IP) address of the storage system and associated credentials. Optionally, a predefined parameter may be used to test whether the storage system is reachable and if the credentials are valid. The shift server 250 may receive the shift request, perform validation operations, and persist the storage system information at 508. The logic flow 500 then moves to block 510 and ends.

Figure 6:
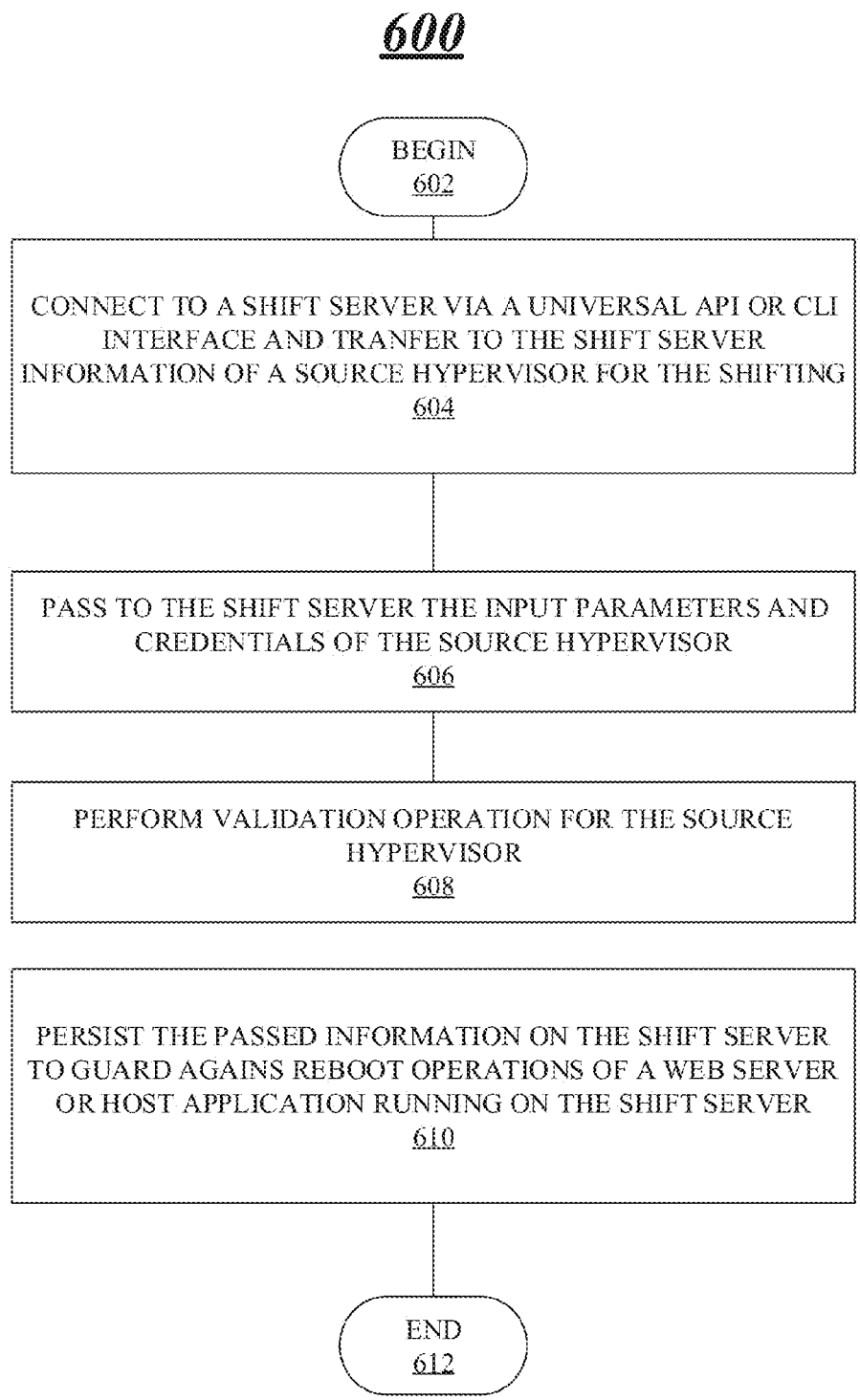
FIG. 6 illustrates an embodiment of an overall logic flow for adding source hypervisor information to a shift server of the virtual machine migration system of FIG. 1.

FIG. 6 illustrates an embodiment of an overall logic flow 600 for adding source hypervisor information to a shift server of the virtual machine migration system of FIG. 1. The logic flow 600 may be representative of some or all of the operations executed by one or more embodiments described herein. The logic flow 600 may be an overall logic flow for the virtual machine migration system 100, presenting a high-level view of the workflow of the shifting process.

In the illustrated embodiment shown in FIG. 6, the logic flow 600 may begin at block 602. The logic flow 600 may connect to a shift server 250 via a universal API or client interface 230 and transfer to the shift server 250 any and all information of the source hypervisor 130 for the shifting at block 604.

The input parameters and credentials for the shifting virtual machine are passed to the shift server 250 for the storage system 260 that hosts the VMs 140, 145 being shifted at block 606. If there are additional global parameters for the source hypervisor applicable to shifting multiple virtual machines, these global parameters will also be stored based upon user inputs, such as network mapping info the shift server may store. For example, the storage administrator connects the shift server via the universal API or client interface 230 allowing parameters along with the credentials of the source hypervisor 130 to be passed to the shift server 250.

The logic flow 600 then moves to block 608. Validation operations are performed for the source hypervisor 130 at block 608. Using the universal API, the validation operations may include, but not limited to, determining the accuracy of the credentials and determining if the source hypervisor 130 is online or active.

The logic flow 600 then moves to block 610 and persists the passed information on the shift server 250 to guard against a reboot operation of a web server or host application running on the shift server 250 at block 610. The logic flow 600 then moves to block 612.

Figure 7:
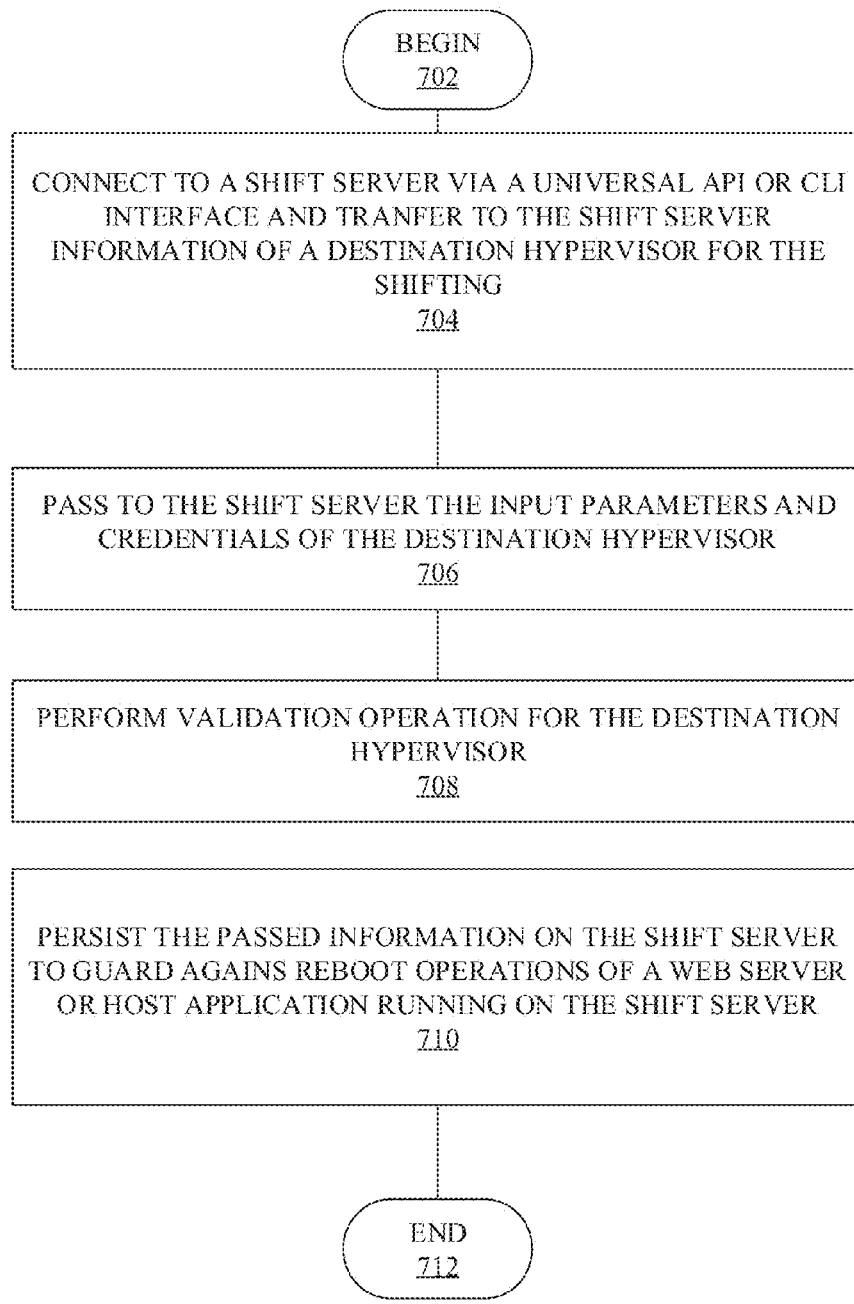
FIG. 7 illustrates an embodiment of an overall logic flow for adding destination hypervisor information to a shift server of the virtual machine migration system of FIG. 1.

FIG. 7 illustrates an embodiment of an overall logic flow 700 for adding destination hypervisor information to a shift server of the virtual machine migration system of FIG. 1. The logic flow 700 may be representative of some or all of the operations executed by one or more embodiments described herein. The logic flow 700 may be an overall logic flow for the virtual machine migration system 100, presenting a high-level view of the workflow of the migration process.

In the illustrated embodiment shown in FIG. 7, the logic flow 700 may begin at block 702. The logic flow 700 may connect to a shift server 250 via a universal API or client interface 230 and transfer to the shift server 250 any and all information of the destination hypervisor 135 for the shifting at block 704.

The input parameters and credentials for the virtual machine that is to be shifted are passed to the shift server 250 for the storage system that hosts the VMs 140, 145 being shifted at block 706. If there are additional global parameters for the destination hypervisor applicable to shifting multiple virtual machines, these global parameters may be stored based on defined parameters, such as network mapping information the shift server 250 may store. For example, the storage administrator connects the shift server via the universal API or client interface 230 and allow a user to pass input parameters along with the credentials of the destination hypervisor 135. Validation operations are performed for the destination hypervisor 135 at block 708. Using the universal API, the validation operations may include, but not limited to, determining the accuracy of the credentials, determining if the destination hypervisor 135 is online or active, and/or other validation techniques.

The logic flow 700 then moves to block 710 and persists the passed information on the shift server 250 to guard against a reboot operation of a web server or host application running on the shift server 250 at block 710. The logic flow 700 then moves to block 712.

Figure 8:
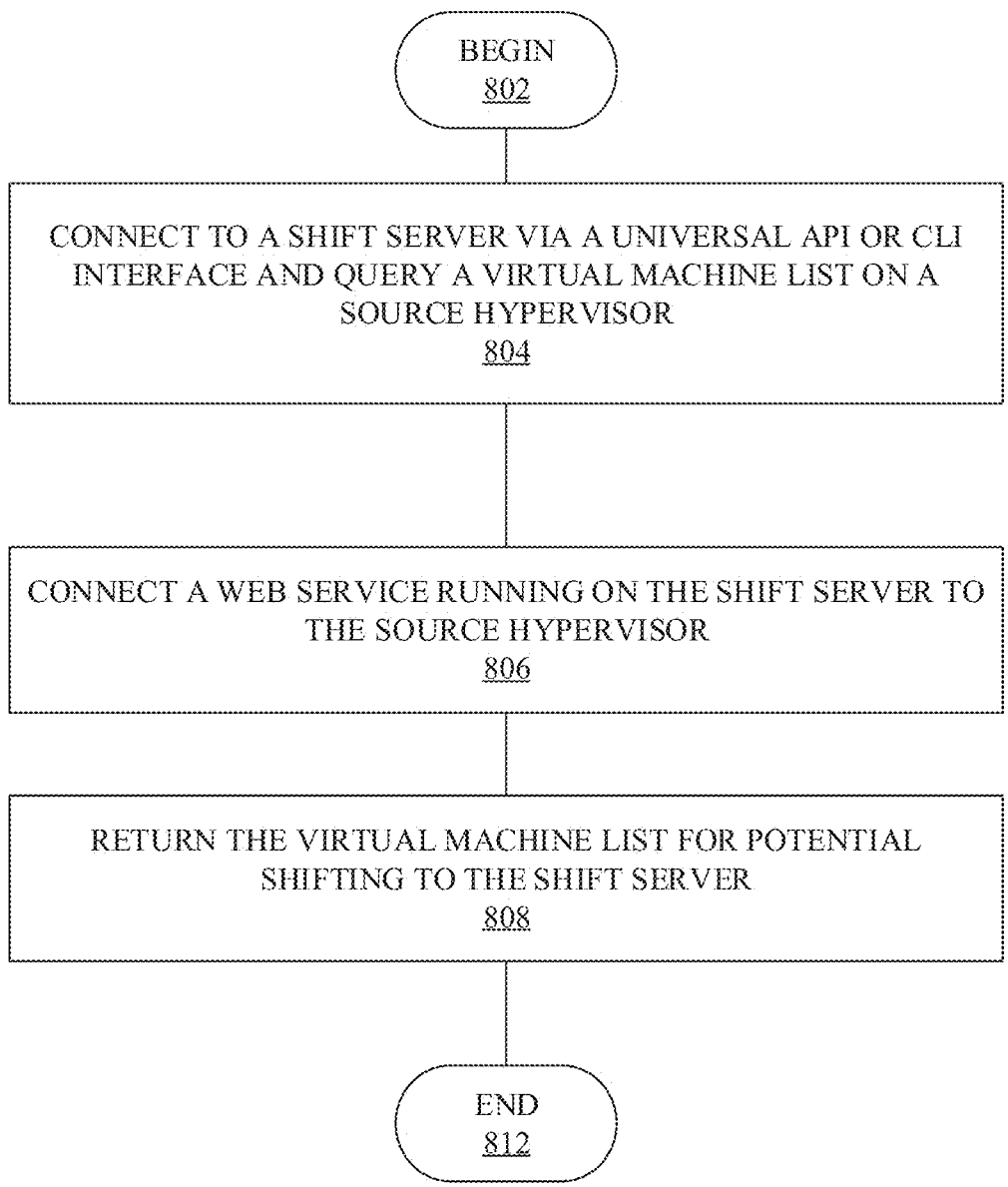
FIG. 8 illustrates an embodiment of an overall logic flow for listing virtual machines on a source hypervisor of the virtual machine migration system of FIG. 1.

FIG. 8 illustrates an embodiment of an overall logic flow 800 for listing virtual machines on a source hypervisor of the virtual machine migration system of FIG. 1. The logic flow 800 may be representative of some or all of the operations executed by one or more embodiments described herein. The logic flow 800 may be an overall logic flow for the virtual machine migration system 100, presenting a high-level view of the workflow of the migration process.

In the illustrated embodiment shown in FIG. 8, the logic flow 800 may begin at block 802. The logic flow 800 may connect to a shift server 250 via a universal API or client interface and query the source hypervisor 130 for a virtual machine list at block 804. For example, the storage administrator connects the shift server 250 via the universal API or client interface 230 for querying the source hypervisor 130. As a prerequisite, the source hypervisor 130 information has been configured onto the shift server 250.

At block 806, web services, using the web server 306, running on the shift server 250 connect to the source hypervisor 130. The virtual machine list on the source hypervisor 130 is returned to the shift server 250 for potentially shifting of any of the virtual machines on the virtual machine list at block 808. The logic flow 800 moves to block 812. The end is at block 812.

The embodiments are not limited to this example.

Figure 9:
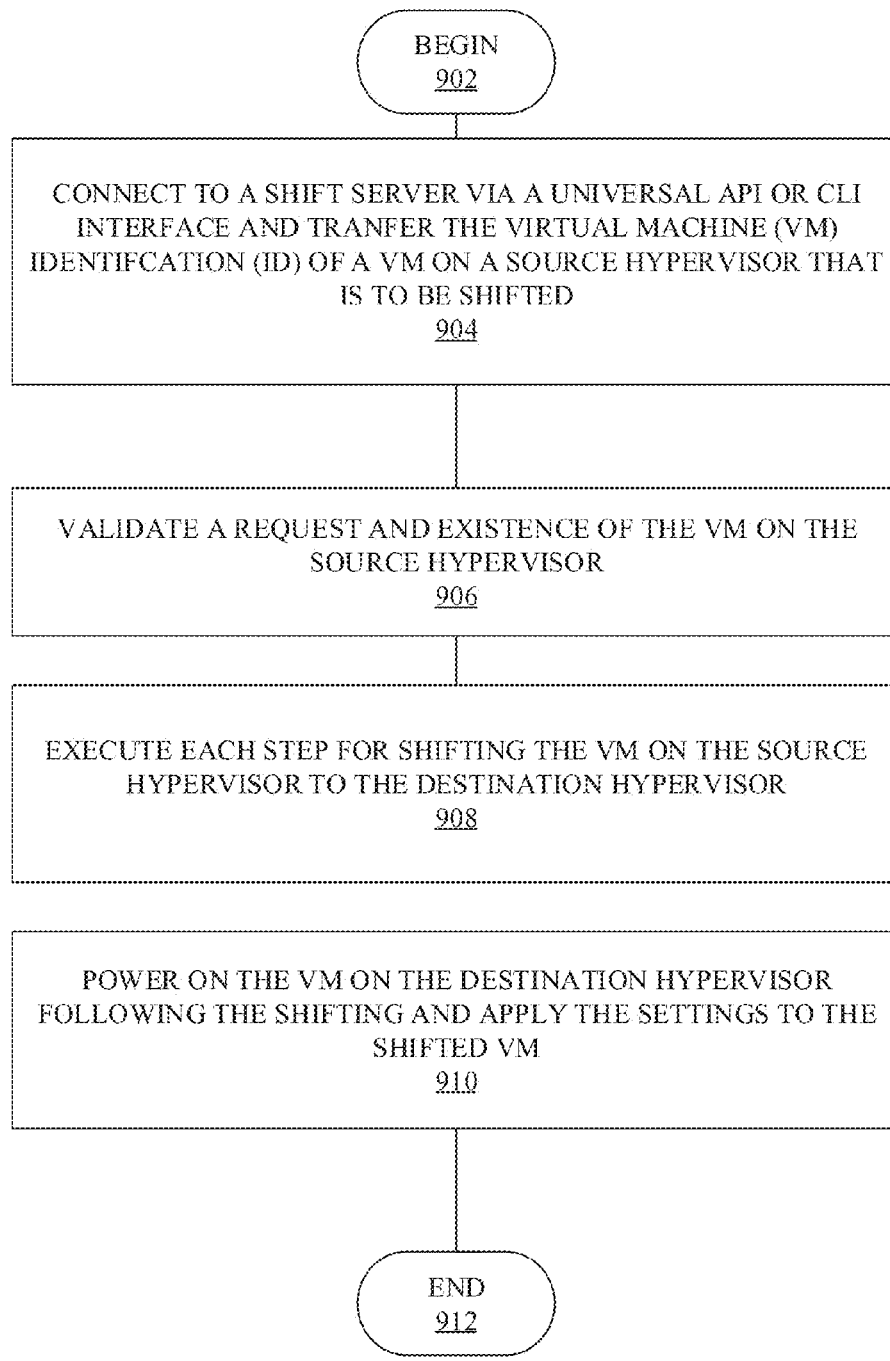
FIG. 9 illustrates an embodiment of an overall logic flow for shifting a virtual machine from a source hypervisor to a destination of the virtual machine migration system of FIG. 1.

FIG. 9 illustrates an embodiment of an overall logic flow 900 for shifting virtual machine from a source hypervisor to a destination hypervisor of the virtual machine migration system of FIG. 1. The logic flow 900 may be an overall logic flow for the virtual machine migration system 100, presenting a high-level view of the workflow of the migration process.

In the illustrated embodiment shown in FIG. 9, the logic flow 900 may begin at block 902. The logic flow 900 may connect to a shift server 250 via a universal API or client interface 230 and transfers the virtual machine identification on a source hypervisor 130 to the shift server 250 at block 904. For example, the shift server connects to the source hypervisor 130 via the universal API or client interface 230 for passing the virtual machine name and/or identification on the source hypervisor 130.

At block 906, both the request to shift the virtual machine and the existence of the virtual machine on the source hypervisor is validated at block 908. Validation operations are performed for the destination hypervisor 135 at block 708. Using the universal API, the validation operations may include, but not limited to, determining the accuracy of the credentials, determining if the destination hypervisor 135 is online or active, and/or other validation techniques.

The logic flow moves to block 908. At block 908, the logic flow 900 executes each step for shifting the virtual machine on the source hypervisor 130 to the destination hypervisor 135. For example, the shift server executes each step required for migration. The steps may include configuring the source virtual machine, configuring network and drive mapping information, and converting the source virtual disk to the format of the destination hypervisor by invoking sis-cloning functionality. For example, using the sis-clone functionality, the shift server 250 is able to convert a virtual machine disk (vmdk) to a virtual hard disk file (vhdx). The step of cloning the source virtual machines may also be performed for the shifting. For example, when the request to execute a shifting of the virtual machine between incompatible hypervisors, a rapid cloning operation of the virtual machine may be executed. The hypervisors are incompatible because they have different hypervisor platforms. The rapid cloning of the virtual machine is performed by determining a source block range of the source data object, creating an empty data object in a destination logical storage unit, determining a destination block range of the empty data object in the destination logical storage unit, and mapping the source block range to the destination block range of the empty data object. The cloning of the virtual machine does not require a physical copy of data involved, and is therefore a fast and time-efficient process. Furthermore, the cloning of a virtual machine is performed off-host, and therefore does not consume any resources from the host itself.

It should also be noted that the cloning may use NetAPP® FlexClone™ technology. For example, a cloning operation of the virtual machine may include maintaining a first database, such as the source virtual machine, in a file system of a storage server. The first database is put into a quiesced state, and a second database, such as the destination virtual machine, is created in the form of a writeable persistent point-in-time image of the first database. The first database or the second database is modified so that the first and second databases have different identifiers. It should be noted that the NetAPP® FlexClone™ technology does not require duplication of data blocks in the active file system, but includes pointers to data blocks of the active file system or a subset thereof. This capability allows efficient and substantially instantaneous creation of a clone that is a writable copy of a file system or a subset thereof.

The database is created in the form of a writeable persistent point-in-time image (WPPI) of the database. As for a dataset in a write out-of-place file system, creating a WPPI of the dataset is faster and requires much less storage space than literally duplicating the dataset. As a result, the present invention provides a method and system for time and space efficient database cloning. The WPPI includes a reference to at east part of the first database but does not duplicate the part of the first database when the WPPI is created. Also, modifying the first database or the second database may occur such that the first database and second database are capable of being online simultaneously within a same domain. The first database and the second database are stored within the same domain and coexist. The end is at block 912.

The embodiments are not limited to this example.

Figure 10:
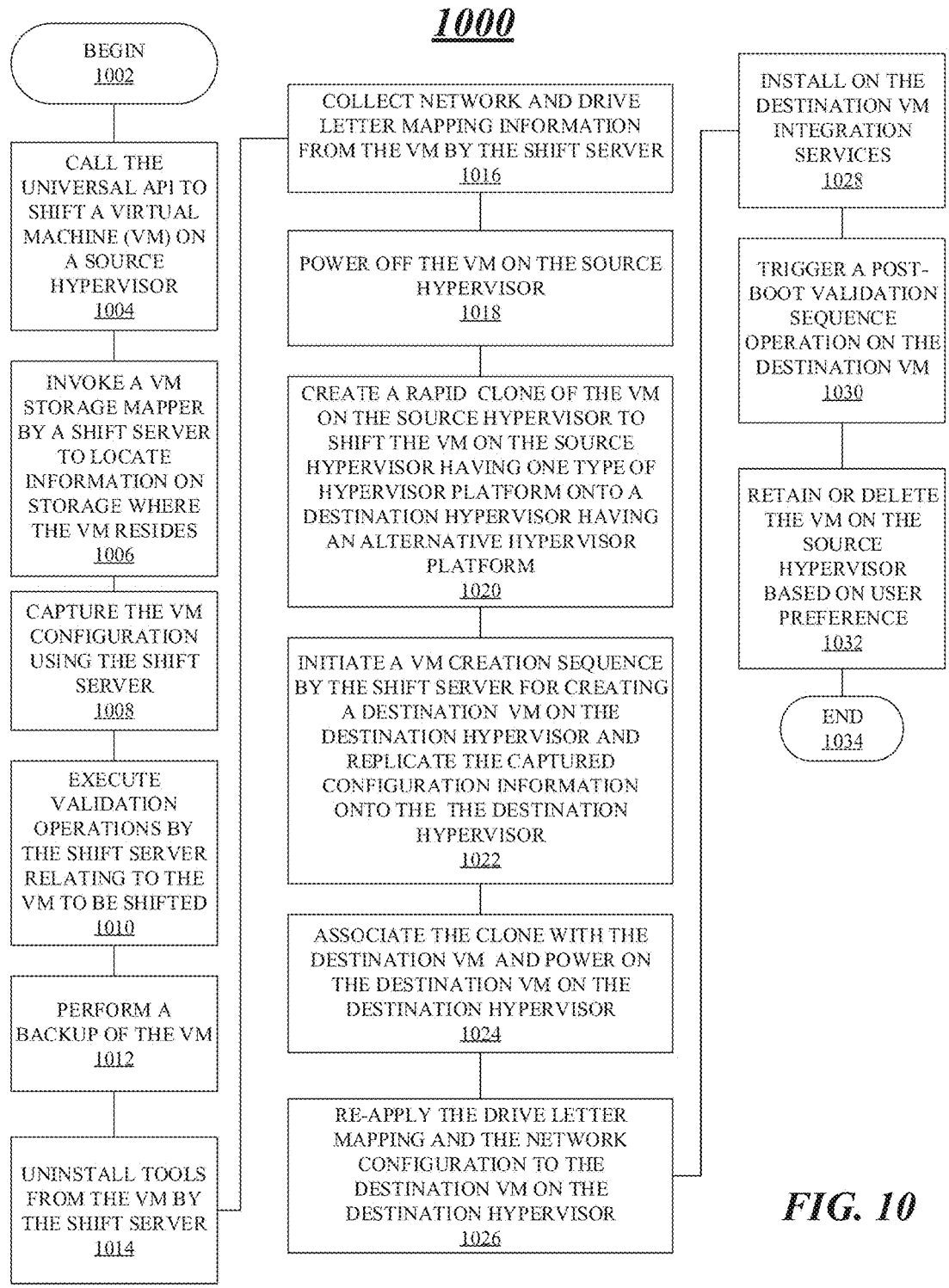
FIG. 10 illustrates an embodiment of an overall logic flow for shifting a virtual machine of the virtual machine migration system of FIG. 1.

FIG. 10 illustrates an embodiment of an overall logic flow 1000 for shifting a virtual machine of the virtual machine migration system of FIG. 1. The logic flow 1000 may be an overall logic flow for the virtual machine migration system 100, presenting a high-level view of the workflow of the migration process. In one embodiment, FIG. 10 depicts the logic flow 100 that is executed for shifting a virtual machine from one hypervisor to another where the hypervisors are incompatible. The logic flow 1000 performs a conversion from a virtual machine disk (vmdk) to a virtual hard disk file (vhdx). However, in one embodiment, the following prerequisites have occurred. First, any and all information, such as credential information, on a storage system that hosts virtual machine disks that are being migrated has been configured on the shift server 250. Second, the information of the source hypervisor 130 and the information for the destination hypervisor 135 is stored on the server. Third, the system administrator calls the universal API on shift server 250 to list all the virtual machines located on the source hypervisor 130 that may be shifted.

In the illustrated embodiment shown in FIG. 10, the logic flow 1000 may begin at block 1002. The logic flow 1000 may call a universal API to shift the virtual machine currently located on the source hypervisor 130 at block 1004. At block 1006, the logic flow 1000 invokes a storage mapper by the shift server 250 to locate information on storage, by an operating system, such as using NetApp Data ONTAP. The logic flow 1000 captures the virtual machine configuration using the shift server 250 at block 1008. The storage mapper a the storage footprint of a virtual machine where the storage for the VM is located, such as the SVM, volume, etc.

Validation operations relating to the source virtual machine 140 that is to be shifted are executed by the shift server 250 at block 1010. A backup of the of the virtual machine 140 is configured. At block 1012, the backup operation taken of the source virtual machine 140 is performed. Tools, such as VMware tools and Hyper-V integration services, are uninstalled from the source virtual machine 140 by the shift server 250 at block 1014.

All network information and drive letter mapping is collected by the shift server 250 from the source virtual machine 140 on the source hypervisor 130 for later applying the network information and drive letter mapping onto the destination virtual machine 145 on the destination hypervisor 135 at block 1016.

The logic flow 1000 powers off the virtual machine on the source hypervisor 130 at block 1018. A rapid clone is created of the virtual machine 140 on the source hypervisor 130 is created to shift the virtual machine 140 on the source hypervisor 130 having one type of hypervisor platform onto a destination hypervisor 135 having an alternative hypervisor platform at block 1020.

Once the cloning is complete, the shift server initiates a virtual creation sequence to spin off a new virtual machine, such as the destination virtual machine 145 on the destination hypervisor 135 on the destination hypervisor 135. The virtual machine creation sequence is initiated by the shift server 250 for creating a destination virtual machine 145 on the destination hypervisor 135 at block 1022. As part of virtual machine creation sequence operation, the source virtual machine 140 configuration will be replicated on the destination virtual machine 145. The clone is associated with the destination virtual machine 145, and the destination virtual machine 145 is turned on at block 1024. For example, the converted file of the virtual machine as a result of the shifting of the VM, such as the converted vhdx, will be associated with the source virtual machine 140 and the destination virtual machine 145 is then powered on.

The drive letter mapping and the network configuration are re-applied to the destination virtual machine 145 on the destination hypervisor 135 at block 1026.

The logic flow 1000 installs integration services, such as Hyper-V integration services, on the destination virtual machine 145 at block 1028. The logic flow 1000 then moves to block 1030. A post-boot validation sequence operation on the destination virtual machine 145 is triggered at block 1030. Based on user preference, the virtual machine 140 on the source virtual machine 140, including disk files, may be retained or deleted based on user preference at block 1032. The end is at block 1034.

As described above, the logic flow of FIGS. 4-10 may each be executed individual or executed as once continuous logic flow for shifting a virtual machine (VM) between a hypervisor having one type of hypervisor platform and a destination hypervisor having an alternative type of hypervisor platform through use of the rapid clone taken of the VM. The shifting is bi-directional between the host and the destination hypervisor. The apparatus may comprise a universal application programming interface (API) used for reconfiguring one or more network interfaces and one or more disks of the dumped network and drive configuration may be restored on the destination virtual machine onto the destination hypervisor. Also, various embodiments described herein preserve the dumped network. The drive letter-mapping configuration may be restored on the destination virtual machine on the destination hypervisor while shifting the virtual machine and enabling co-existence between the source virtual machine and the destination virtual machine. The dumped network and drive configuration may be restored on the destination virtual machine on the destination hypervisor and the dumped network and drive configuration may be restored on the destination virtual machine shifted onto the destination hypervisor. The co-existence between the source virtual machine allows for independent control between the virtual machine preserved on the source hypervisor and the virtual machine shifted onto the destination hypervisor.

As part of the shifting meta-data is read of the virtual machine on the hypervisor. An empty VM is created on the destination hypervisor and meta-data is created according to specifications of the destination hypervisor. The virtual machine of the destination hypervisor is created. A clone is taken of data taken of the virtual machine on the hypervisor.

Credential information and configuration information relating to one or more network interfaces and one or more disks on the virtual machine is collected and preserved for reconfiguring one or more network interfaces and associated the clone of the one or more disks of the virtual machine. Network settings are collected and preserved of a guest operating software (OS) of the VM prior to the shifting. A predefined number of network adapters, which are preserved from the virtual machine on the source hypervisor, are attached onto the virtual machine shifted onto the destination hypervisor. The virtual machine operations of the virtual machine on the source hypervisor are translated onto the virtual machine shifted onto the destination hypervisor for automating virtual machine mapping.

In one embodiment, the drive letter mapping of the virtual machine on the source hypervisor is collected and preserved. The drive letter mapping of the virtual machine collected from the hypervisor are attached onto the VM shifted onto the destination hypervisor.

The embodiments are not limited to this example.

As described below in greater detail, the migration of the virtual machine may use the following logic flows described in FIGS. 11-19 as part of the overall shifting of the virtual machine. The logic flows described in FIGS. 11-19 may also work independent and/or in association with the logic flows described in FIGS. 4-10.

Figure 11:
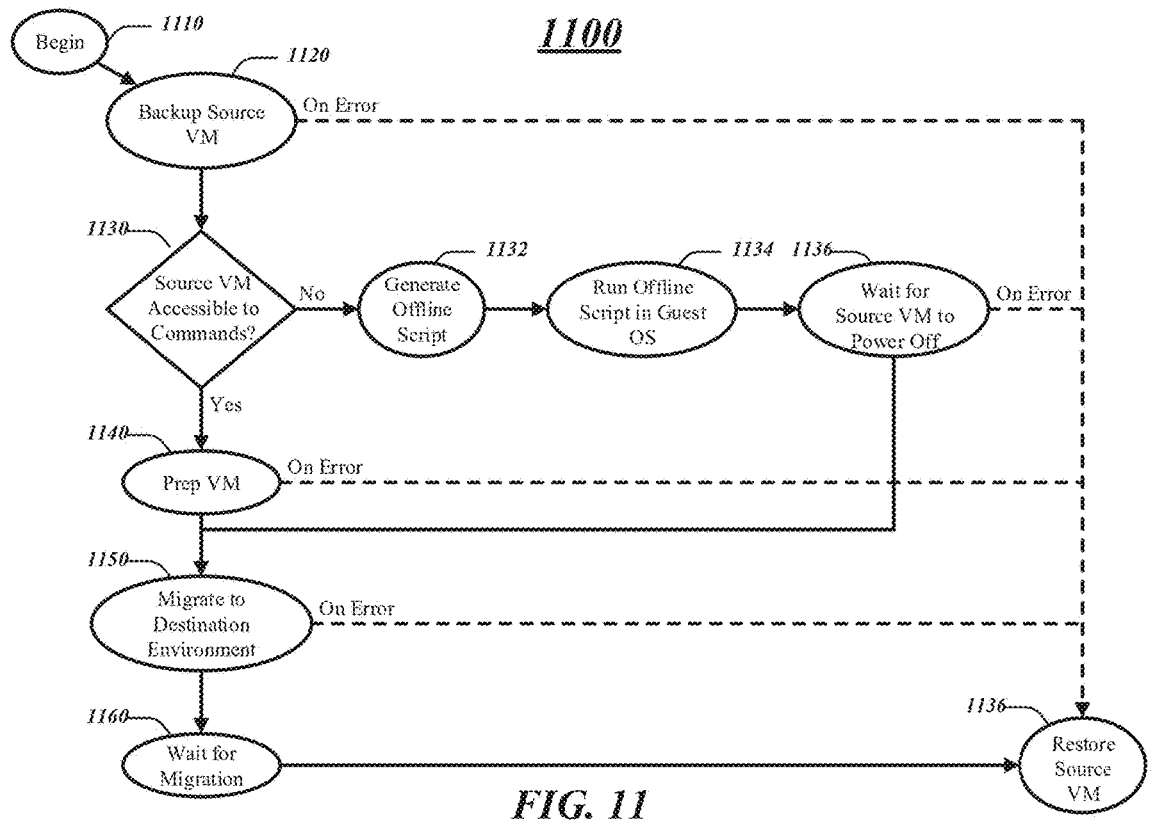
FIG. 11 illustrates an embodiment of an overall logic flow for migrating the virtual machine migration system of FIG. 1 as part of a shifting operation.

FIG. 11 illustrates one embodiment of a logic flow 1100. The logic flow 1100 may be representative of some or all of the operations executed by one or more embodiments described herein. The logic flow 1100 may be an overall logic flow for the virtual machine migration system 100, presenting a high-level view of the workflow of the migration process.

In the illustrated embodiment shown in FIG. 11, the logic flow 1100 may begin at block 1110. This may correspond to the initiation of a virtual machine migration for a particular instantiation of a guest OS. In some cases, the logic flow 1100 may be initiated manually be an administrator of a computer system. In others, the logic flow 1100 may be initiated programmatically as part of a group of migrations. For example, a plurality of guest OS installations may all be migrated from one hypervisor to another with an automated process automatically migrating each one in turn or in parallel. The logic flow 1100 then proceeds to block 1120.

The logic flow 1100 may back up the source VM 140 at block 1120. Errors may occur during the migration process—from bugs, from some unusual element of the VM environment not accounted for in the migration application 110, etc. When this occurs it is beneficial to have the option to restore the source VM 140. If an error occurs during the backup source VM process itself the logic flow 1100 may proceed to block 1136 where the source VM 140 is attempted to be restored. Otherwise, the logic flow 1100 may continue to block 1130.

The logic flow 1100 may determined whether the source VM 140 is accessible to automated commands at block 1130. If the source VM 140 is accessible then the migration application 110 can initiate scripts within the guest OS 150 within the source VM 140, and the logic flow 1100 proceeds to box 1140. If the source VM 140 is not accessible then the migration application 110 will generate an offline script and hand that script off to a human operator to run in the guest OS 140, and the logic flow 1100 proceeds to box 1132.

The logic flow 1100 may generate an offline script at box 1132. This offline script contains all of the work that needs to be done by the migration application 110 in the guest OS 150 in the source VM 140. The logic flow 1100 then proceeds to box 1134.

The logic flow 1100 may run the offline script in the guest OS 150 in the source VM 140 at box 1134. While the activity of the offline script is performed programmatically through the scripting application programming interface (API) of the guest OS 150, the transfer of the offline script into the guest OS 150 and the initiation of it are performed by a human operator. The logic flow 1100 then proceeds to box 1136.

The logic flow 1100 may wait for the source VM 140 to power off at box 1136. The final operation of the offline script is to power-down the source VM 140—stopping execution of the virtual machine by the physical host. The migration application 110 waits for this powered-off state in order to know that the offline script has completed. If an error occurs the logic flow 1100 proceeds to block 1136. Otherwise, the logic flow 1100 proceeds to block 1150.

The logic flow 1100 may prepare the source VM 140 at block 1140. The preparation of the source VM 140 may generally correspond to the functions of the offline script, but initiated programmatically by the migration application 110 and performed in stages rather than unified into a single offline script. Initiating the script in the guest OS 150 may comprise using a remote administration API of the guest OS 150 or may comprise using a remote administration API of the source hypervisor 130. If an error occurs the logic flow 1100 proceeds to block 1136. Otherwise, the logic flow 1100 proceeds to block 1150.

The logic flow 1100 may migrate the guest OS 150 to the destination environment provided by the destination hypervisor 135 at block 1150. While all of the described steps of logic flow 1100 are part of the migration process, box 1150 corresponds to the actual transition of configuration information from one environment to another. If an error occurs the logic flow 1100 proceeds to block 1136. Otherwise, the logic flow 1100 proceeds to block 1160.

The logic flow 1100 may include the migration application 110 waiting for the migration to complete at block 1160. As the migration makes use of scripts that run within the guest OS 150 running on the destination VM 145 the migration application 110 may not be able to directly monitor the progress of the scripts and instead depend on the power cycling of the destination VM 145 to monitor whether the scripts have completed. The logic flow 1100 then proceeds to box 1136.

The logic flow 1100 may restore the source VM 140 at block 1136. This restoration allows for a return to the original source VM 140 run by the source hypervisor 130 in case, for example, a problem develops with the destination VM 145. With this step complete the migration application 110 may have completed its task or may continue with the migration of other virtual machines.

The embodiments are not limited to this example.

Figure 12:
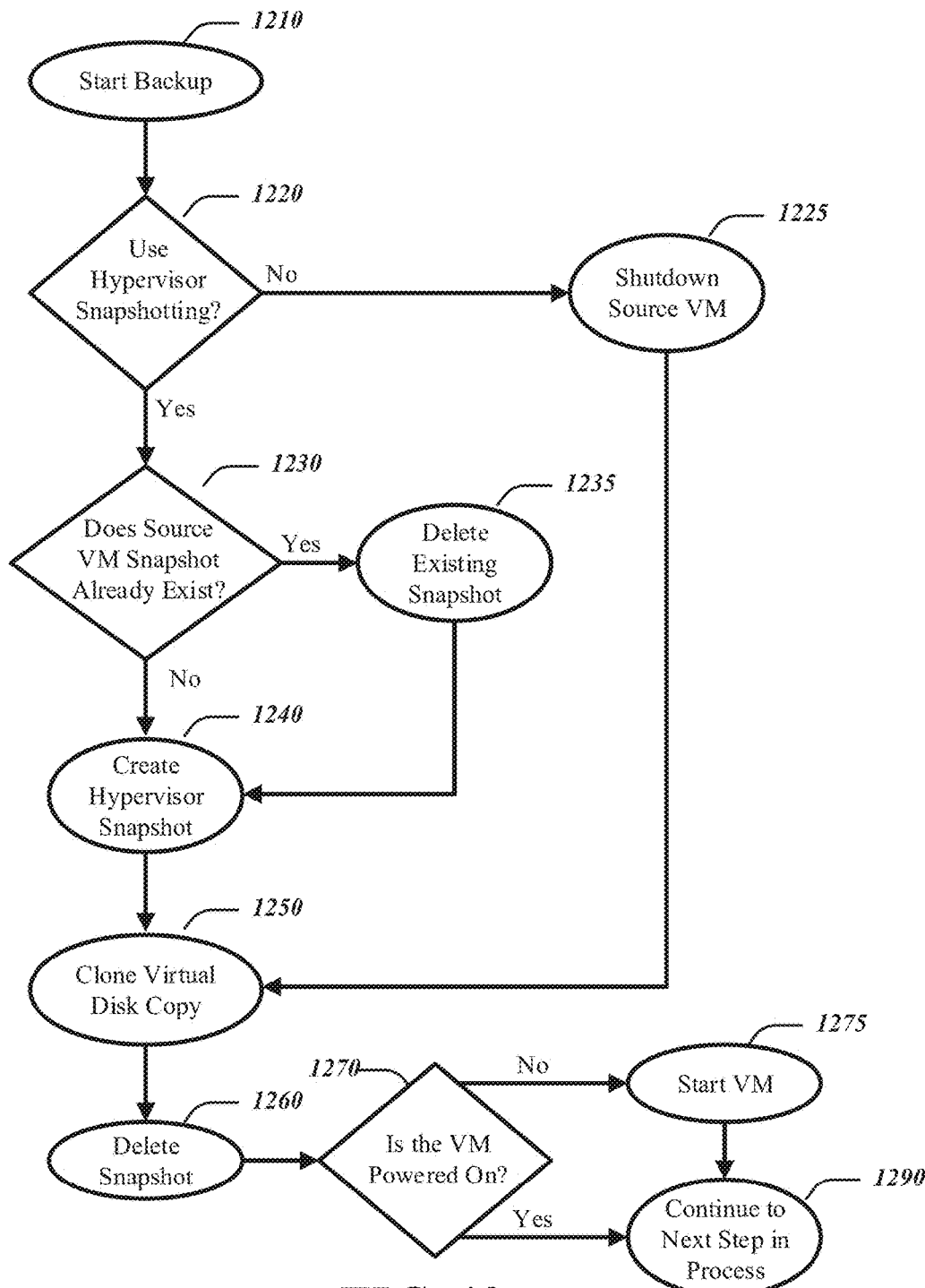
FIG. 12 illustrates an embodiment of a detailed logic flow for the backup stage of the overall logic flow of FIG. 11.

FIG. 12 illustrates one embodiment of a logic flow 1200. The logic flow 1200 may be representative of some or all of the operations executed by one or more embodiments described herein. The logic flow 1200 may be a detailed logic flow for the backup stage of the overall logic flow 1100 of FIG. 11.

In the illustrated embodiment shown in FIG. 12, the logic flow 1200 may begin at block 1210. This may correspond to the transition of the overall logic flow 1100 into block 1120 of FIG. 11. The logic flow then proceeds to block 1220.

The logic flow 1200 may determine whether to use hypervisor snapshotting at block 1220. This decision may be made as a question of policy (whether the administrator wants to use hypervisor snapshotting) or possibility (whether the hypervisor supports snapshotting). In either case, if hypervisor snapshotting is not to be used the logic flow 1200 proceeds to box 1225. If hypervisor snapshotting is to be used the logic flow 1200 proceeds to box 1230.

The logic flow 1200 may shutdown the source VM 140 at block 1225. This may leave the guest OS 150 in the source VM 140 in a safe state for backing up. The logic flow 1200 then proceeds to block 1250.

The logic flow 1200 may determine whether a source VM snapshot already exists at block 1230. For example, a snapshot may have been taken as part of a failed migration attempt with the current instantiation of logic flow 1200 a second or later attempt. If one does, the logic flow proceeds to block 1235. If not, the logic flow proceeds to block 1240.

The logic flow 1200 may delete the existing snapshot at block 1235 and then proceed to block 1240.

The logic flow 1200 may create a hypervisor snapshot at block 1240. This may comprise sending a command to the source hypervisor 130 instructing it to create the hypervisor snapshot. A hypervisor snapshot may comprise the creation the hypervisor modifying the manner in which it provides source VM virtual disk 170. The hypervisor may, upon taking the snapshot, continue to use the existing virtual disk blocks 190 for when the guest OS 150 reads the source VM virtual disk 170 but create additional blocks, rather than overwriting the existing virtual disk blocks 190, wherever the guest OS 150 (either of its own accord or on behalf of an application it supports) performs a write to the source VM virtual disk 170. These additional blocks may be known as a delta disk, containing the changes to the source VM virtual disk 170 since the creation of the snapshot. As such, the existing virtual disk blocks 190 are maintained in a known safe state while the guest OS 150 continues to operate, preventing downtime for the guest OS 150 and its applications during this state of the migration process. The logic flow 1200 then proceeds to block 1250.

The logic flow 1200 may clone a virtual disk copy at block 1250. This may not involve copying all or any of the virtual disk blocks 190 comprising the source VM virtual disk 170. Instead it may involve creating a new file that merely links to the existing blocks, for example via a hard link, instead of duplicating the blocks. This clone may be made from the hypervisor snapshot where one exists. The logic flow 1200 then proceeds to block 1260.

The logic flow 1200 may delete the hypervisor snapshot, if any, at block 1260. With the clone of the virtual disk prepared the hypervisor snapshot is no longer of use and can be discarded. With the clone of the virtual disk prepared, the file system 160 will prevent the virtual disk blocks 190 referenced by the clone from being modified, with new blocks being created when the guest OS 150 performs writes. This is similar to the technique used by the source hypervisor 130, but performed by the file system 160 instead of the source hypervisor 130. This clone of the virtual disk is now available for use in restoring the guest OS 150 to a known good state in case of problems with the migration process. The source hypervisor 130 will, from its own perspective, merge the additional blocks it created, the delta disk, back into the virtual disk blocks 180. However, due to the references to these blocks created by the cloned virtual disk, the file system 160 will maintain the distinction between the live-updating source VM virtual disk 170 and the clone created by the migration application 110. The logic flow 1200 then proceeds to block 1270.

The logic flow 1200 may determine whether the source VM 140 is powered on at block 1270. The source VM 140 may have been powered off at block 1225. If the source VM 140 is not powered on the logic flow 1200 proceeds to block 1275. Otherwise the logic flow 1200 proceeds to block 1290.

The logic flow 1200 may start the source VM 140 at block 1275 and then proceed to block 1290.

The logic flow 1200 may continue to the next step in the overall process at block 1290. This may correspond to the transition of the overall logic flow 1100 out of block 1120 of FIG. 11.

The embodiments are not limited to this example.

Figure 13:
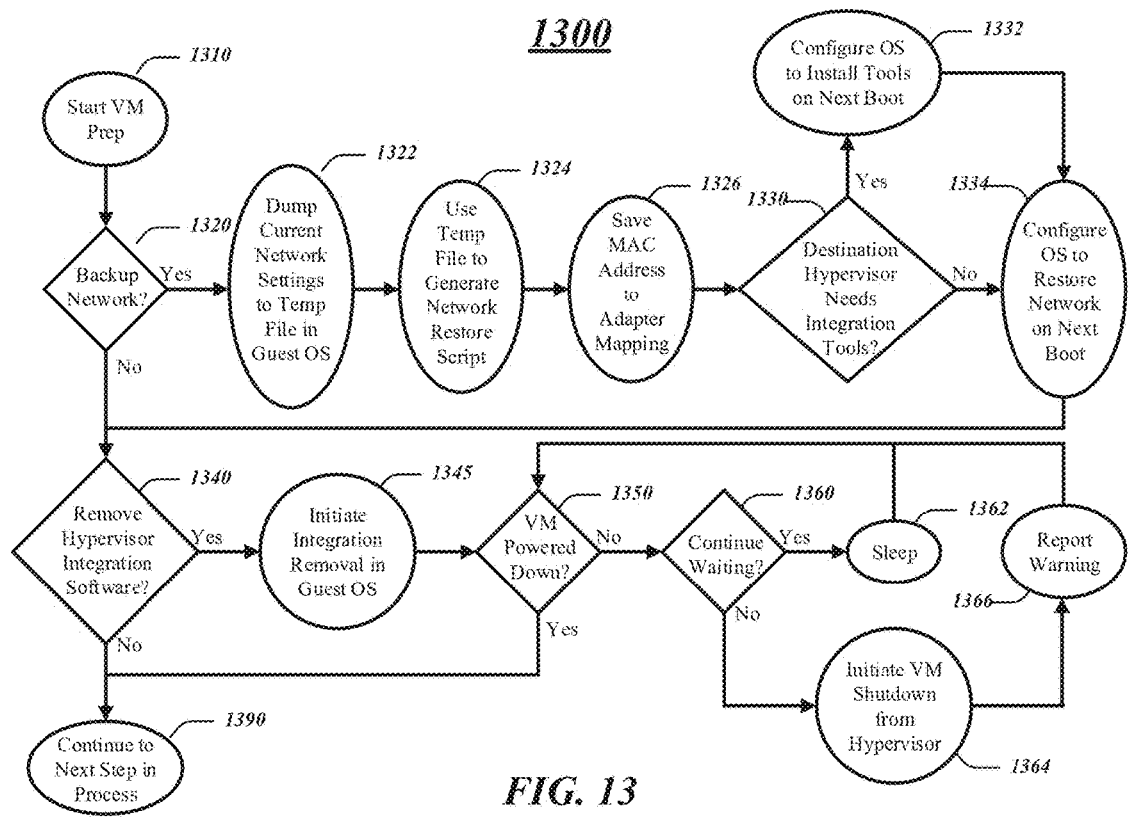
FIG. 13 illustrates an embodiment of a detailed logic flow for the VM prep stage of the overall logic flow of FIG. 11.

FIG. 13 illustrates one embodiment of a logic flow 1300. The logic flow 1300 may be representative of some or all of the operations executed by one or more embodiments described herein. The logic flow 1300 may be a detailed logic flow for the VM prep stage of the overall logic flow 1100 of FIG. 11.

Figure 22:
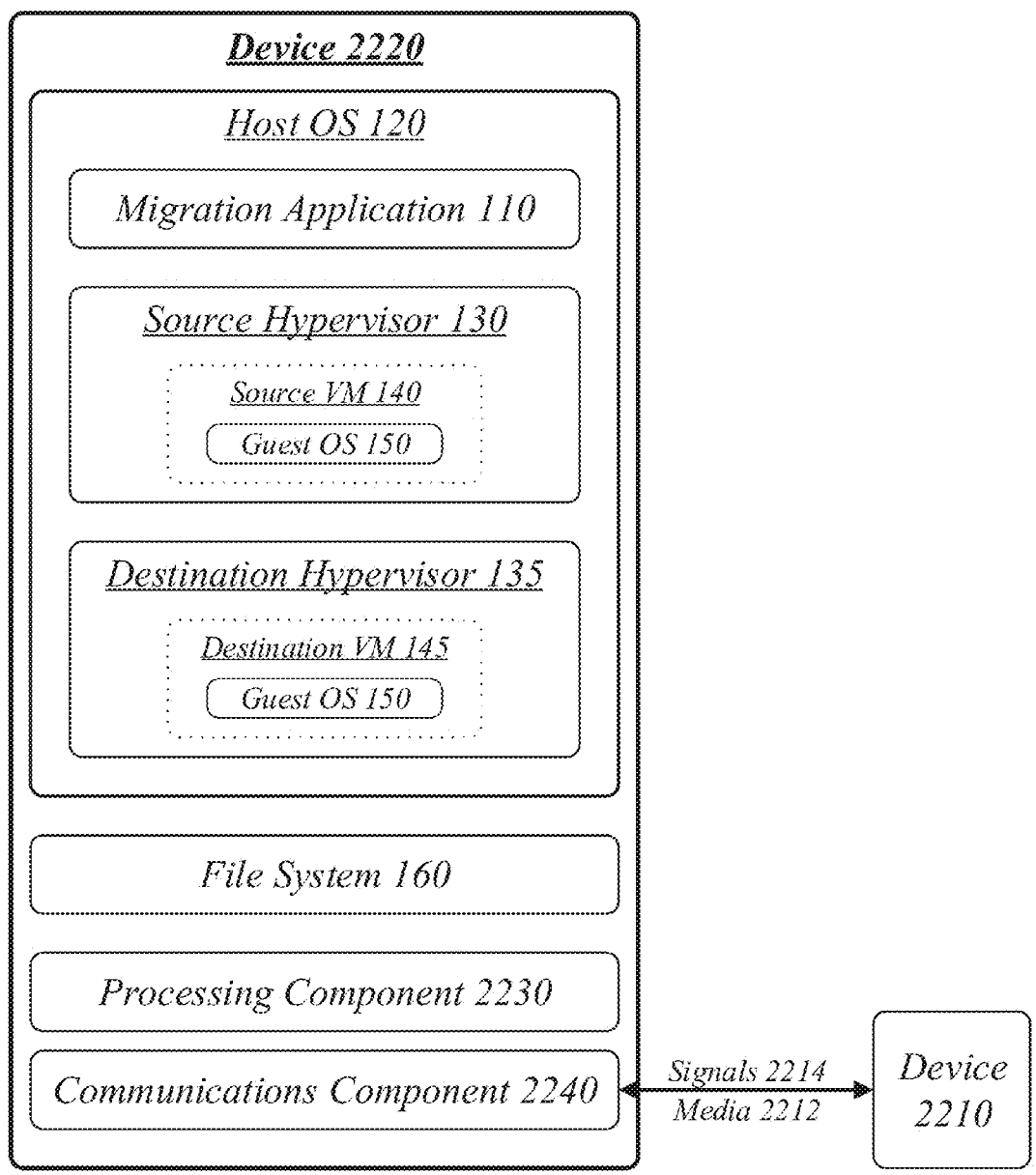
FIG. 22 illustrates an embodiment of a centralized system for the virtual machine migration system of FIG. 1.

In the illustrated embodiment shown in FIG. 22, the logic flow 1300 may begin at block 1310. This may correspond to the transition of the overall logic flow 1100 into block 1140 of FIG. 11. The logic flow then proceeds to block 1320.

The logic flow 1300 may determine whether to backup the network settings at block 1320. This may be determined according to configuration of the migration application 110. If the network settings are to be backed up the logic flow 1300 proceeds to block 1322. Otherwise, the logic flow 1300 proceeds to block 1340.

The logic flow 1300 may dump the current network settings to a temp file in the guest OS 150 at block 1322 and then proceed to block 1324.

The logic flow 1300 may use the temp file to generate a network restore script at block 1324. When the guest OS 150 later boots in the destination VM 145 the network restore script may be used there to set up the network for the guest OS 150 in the destination VM 145. The logic flow 1300 then proceeds to block 1330.

The logic flow 1300 may determine whether the destination hypervisor 135 needs integration tools and services at block 1330. Some operating systems require integration tools and services in order to function properly within a virtual machine provided by a hypervisor. If integration tools and services are needed then the logic flow 1300 proceeds to block 1332. Otherwise the logic flow 1300 proceeds to block 1334.

The logic flow 1300 may configure the guest OS 150 to install integration tools and services on the next boot at block 1332. The next boot is expected to occur on top the destination VM 145 where the tools and services will be needed. This configuration may comprise setting installation scripts to run on the next boot. The logic flow 1300 then proceeds to block 1334.

The logic flow 1300 may configure the guest OS 150 to restore the network on next boot at block 1334. This configuration may comprise setting the network restore script to run on the next boot. The logic flow may then proceed to block 1340.

The logic flow 1300 may determine whether to remove integration software for the source hypervisor 130 from the guest OS 150 at block 1340. In some cases, the administrators of the computing system may desire to keep existing integration tools and services installed in order to allow transition back to the source VM 130. In some cases, transitioning back to the source VM 130 may be motivated by eventual dissatisfaction with the destination VM 145 or may be motivated by the use of software applications on top the guest OS 150 where one or more only work or work better on the source VM 140 and one or more only work or work better on the destination VM 145. Alternatively, the removal of hypervisor integration software may be unnecessary due to hypervisor integration software not being used with the source hypervisor 130. Whatever the reason, if hypervisor integration software is to be removed the logic flow 1300 proceeds to block 1345. Otherwise, the logic flow 1300 proceeds to block 1390.

The logic flow 1300 may initiate removal of the integration software in the guest OS 150 at block 1345. This may be performed by initiating the running of a script within the guest OS 150. This script may conclude with a command to power down the source VM 140 to indicate that the script has completed its task. As this removal occurs after creation of the cloned backup disk, the restoration of the source VM virtual disk 170, if performed, will restore these tools. The logic flow 1300 may then proceed to block 1350.

The logic flow 1300 may check with the source VM 140 has powered down at block 1350. If so, the hypervisor tools and services have been successfully removed and the logic flow 1300 may proceed to block 1390. Otherwise, the logic flow 1300 proceeds to block 1360.

The logic flow 1300 may determine whether to continue waiting for the source VM 140 to power down at block 1360. The migration application 110 may have a limit to how long it will wait for the tools to be removed as measured by a watchdog timer. If that limit has not been reached the logic flow 1300 may proceed to block 1362. If it has been reached the logic flow 1300 may proceed to block 1364.

The logic flow 1300 may have the migration application 110 sleep at block 1362. This may consist of a timed period of inactivity—such as may be registered with the host OS 120—to give the source VM 140 more time to power down. The logic flow 1300 may then loop back to block 1350.

The logic flow 1300 may initiate shutdown of the source VM 140 with the source hypervisor 130 at block 1364. If the watchdog timer has expired the migration application 110 has reached the point where it is no longer willing to wait for the guest OS 150 to shut down the source VM 140 on the basis of the integration software removal script. As such, the migration application 110 directly commands the source hypervisor 130 to stop the source VM 140. The logic flow 1300 then proceeds to block 1366.

The logic flow 1300 may report a warning at block 1366. Having forced the source VM 140 to power down from the hypervisor leaves the guest OS 150 in an unclean or otherwise problematic state. This warning reports to an administrator of the migration application 110 of this possibility. The logic flow may then proceed back to block 1350 to check for the source hypervisor 130 having powered down the source VM 140.

The logic flow 1300 may continue to the next step in the overall process at block 1390. This may correspond to the transition of the overall logic flow 1100 out of block 1140 of FIG. 11.

The embodiments are not limited to this example.

Figure 14:
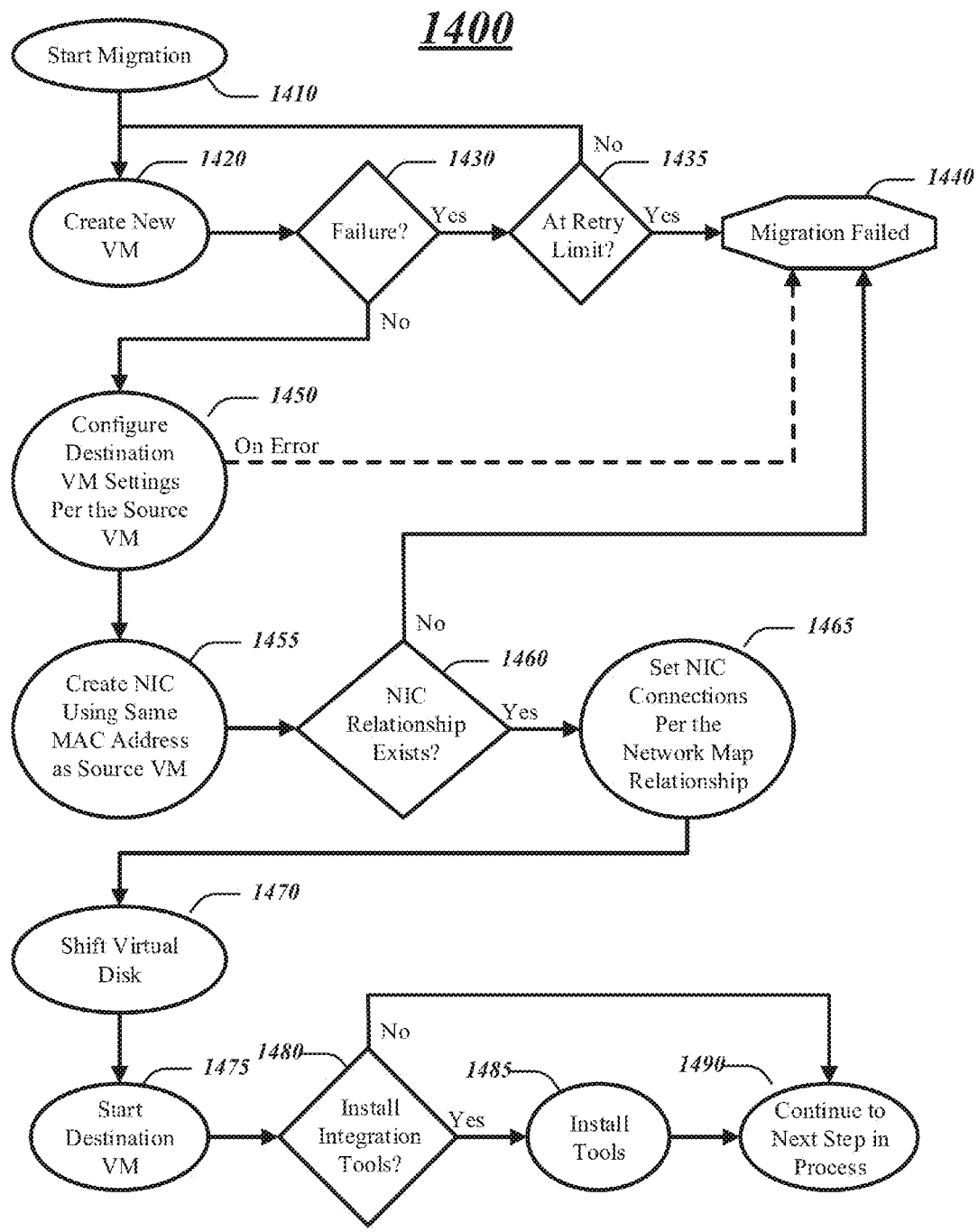
FIG. 14 illustrates an embodiment of a detailed logic flow for the migration stage of the overall logic flow of FIG. 11.

FIG. 14 illustrates one embodiment of a logic flow 1400. The logic flow 1400 may be representative of some or all of the operations executed by one or more embodiments described herein. The logic flow 1400 may be a detailed logic flow for the migration stage of the overall logic flow 1100 of FIG. 11.

In the illustrated embodiment shown in FIG. 14, the logic flow 1400 may begin at block 1410. This may correspond to the transition of the overall logic flow 1100 into block 1150 of FIG. 11. The logic flow then proceeds to block 1420.

The logic flow 1400 may create a new virtual machine, the destination VM 145, at block 1420. This may be created on the same physical hardware as the source VM 140 or at new physical hardware. The logic flow 1400 then proceeds to block 1430.

The logic flow 1400 may determine whether the creation of destination VM 145 has failed at block 1430. In some cases errors may occur in the VM-creation process and the process may have to be attempted multiple times. If the VM creation failed then the logic flow 1400 proceeds to block 1435. Otherwise, the logic flow 1400 proceeds to block 1450.

The logic flow 1400 may determine whether the migration application 110 has reached its retry limit at block 1435. The migration application 110 may be configured to only attempt VM creation a limited number of times in order to forestall a potentially infinite loop. If it is at the retry limit, the logic flow 1400 may then proceed to block 1440. If the retry limit has not been reached then the logic flow 1400 may loop back to block 1420 and re-attempt the creation of destination VM 145.

The logic flow 1400 may determine that migration has failed at block 1440. With the VM creation retry limit reached, or configuration of the destination VM 145 having failed, the migration is not successful. The migration application 110 may indicate this failure to an administrator of the application. The migration application 110 may proceed to restore the source VM 140, as following the "on error" path from block 1150 of FIG. 11.

The logic flow 1400 may configure the destination VM 145 settings per the source VM 140 settings at block 1450. For example, the destination VM 145 may be configured to have the same number of CPUs, same amount of RAM, and other virtualized hardware configurations as with the source VM 140 so as to provide as much continuity of virtualized hardware platform as possible to the guest OS 150. If an error occurs during this process the logic flow 1400 may proceed to block 1440. If this process completes successfully the logic flow 1400 may proceed to block 1455.

The logic flow 1400 may create one or more network interface controllers (NICs) in the destination VM 145 using the same media access control (MAC) addresses as in the source VM 140 at block 1455. These NICs are virtualized network adaptors used by the destination hypervisor 135 to bridge real network interfaces to the guest OS 150 when running on the destination VM 145. By configuring the destination VM 145 with the same MAC addresses as used with the source VM 140 the guest OS 150 will be able to be configured by scripts running within the guest OS 150 to match up internal network connections for the OS with the virtualized network adaptors. If new MAC addresses were assigned then the scripts may be unable to determine which NIC should be connected with which internal connections for the guest OS 150 as programs running within the guest OS 150 don't have visibility to the actual network configuration of the host OS 120. The logic flow 1400 then proceeds to block 1460.

The logic flow 1400 determines whether it has access to a NIC relationship map at block 1460. The NIC relationship map is a simple one for one relational link between the various host operating systems, which may be used where a different host operating system is used for the source VM 140 and the destination VM 145. Since each hypervisor employs a specialized network implementation it is valuable to maintain a key. If an appropriate map is found then the destination VM NIC is connected to the appropriate network on the destination host OS. If it does not, it cannot configure the network and the logic flow 1400 proceeds to block 1440. If it does, the logic flow 1400 proceeds to block 1465.

The logic flow 1400 sets NIC connections per the network map relationship at block 1465. Connections between the guest OS 150 are configured to the virtualized NICs based on the preconfigured relational mapping. The network connections of the guest OS 150 are rebuilt such that each internal connection connects to the virtualized NIC with the same MAC address as that internal connection was connected to when the guest OS 150 was in the source VM 140. The logic flow 1400 then proceeds to block 1470.

The logic flow 1400 may shift the virtual disk at block 1470. This may correspond to the creation of the destination VM virtual disk 175 through the creation of one or more new header, footer, or other metadata blocks for the virtual disk blocks 190 of the source VM virtual disk 170. The logic flow 1400 then proceeds to block 1475.

The logic flow 1400 may start the destination VM 145 at block 1475. This may comprise sending a power-on command to the destination hypervisor 135. The logic flow 1400 then proceeds to block 1480.

The logic flow 1400 may determine whether to install integration tools and services at block 1480. This determination may be an inherent consequence of whether the guest OS 150 was configured to automatically install integration tools and services for the destination hypervisor 135 at its next boot at block 432 of FIG. 22. If this boot configuration was performed, the logic flow 1400 proceeds to block 1485. Otherwise, the logic flow 1400 proceeds to block 1490.

The logic flow 1400 may install integration tool and services in the guest OS 150 at block 1485. This may be performed automatically by scripts initiated at boot by the guest OS 150. The logic flow 1400 then proceeds to block 1490.

The logic flow 1400 may continue to the next step in the overall process at block 1490. This may correspond to the transition of the overall logic flow 1100 out of block 1150 of FIG. 11.

The embodiments are not limited to this example.

Figure 15:
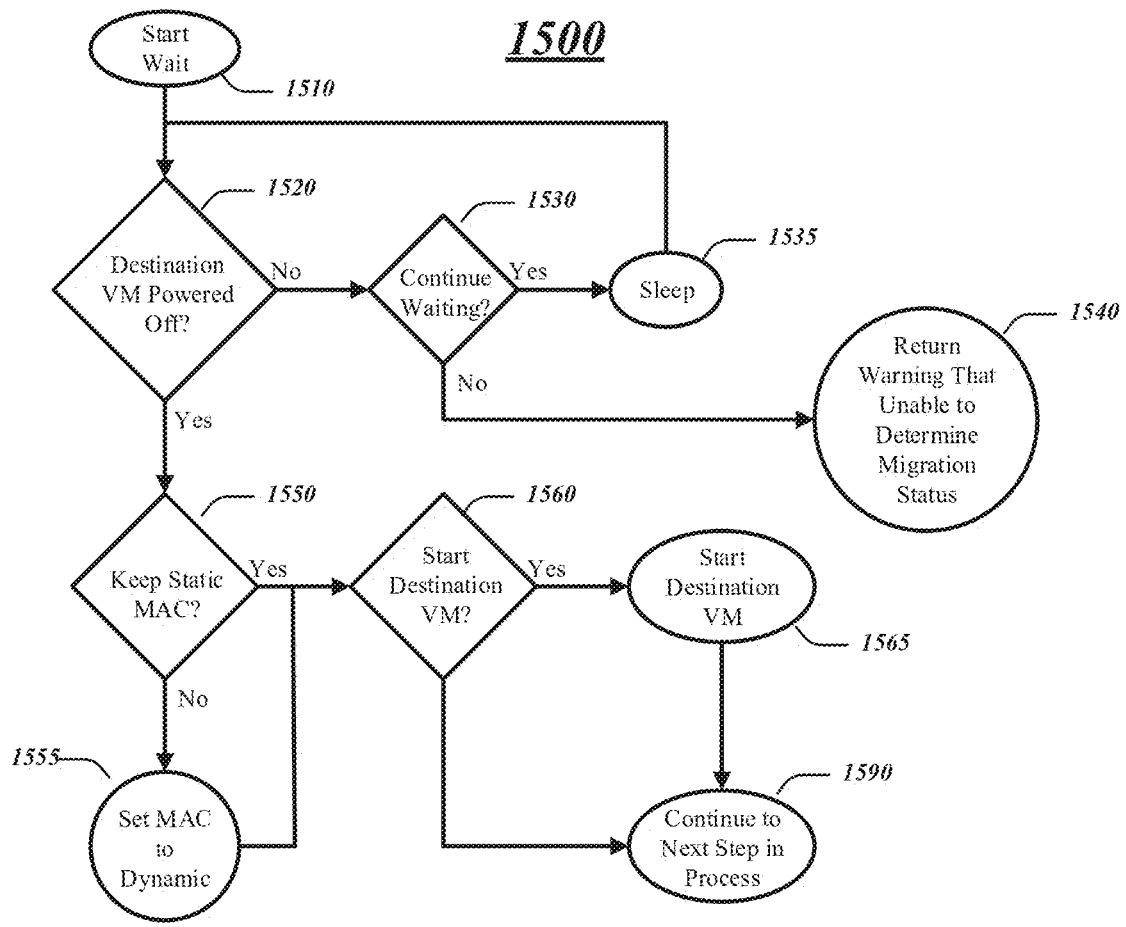
FIG. 15 illustrates an embodiment of a detailed logic flow for the wait stage of the overall logic flow of FIG. 11.

FIG. 15 illustrates one embodiment of a logic flow 1500. The logic flow 1500 may be representative of some or all of the operations executed by one or more embodiments described herein. The logic flow 1500 may be a detailed logic flow for the wait stage of the overall logic flow 1100 of FIG. 11.

In the illustrated embodiment shown in FIG. 15, the logic flow 1500 may begin at block 1510. This may correspond to the transition of the overall logic flow 1100 into block 1160 of FIG. 11. The logic flow then proceeds to block 1520.

The logic flow 1500 may determine whether the destination VM 145 has powered off at block 1520. The one or more scripts configured to be automatically initiated at the boot of guest OS 150 may conclude with a command to the guest OS 150 to power off. As the migration application 110 may not have visibility into the internal operation of the guest OS 150 it may use power state transitions to monitor the progress of the scripts. If the destination VM 145 has powered off, the logic flow 1500 proceeds to block 1550. Otherwise, the logic flow 1500 proceeds to block 1530.

The logic flow 1500 may determine whether to continue waiting for the destination VM 145 to power down at block 1530. The migration application 110 may have a limit to how long it will wait for the scripts initiated at the boot of the guest OS 140 to complete as measured by a watchdog timer. If that limit has not been reached the logic flow 1500 may proceed to block 1535. If it has been reached the logic flow 1500 may proceed to block 1540.

The logic flow 1500 may have the migration application 110 sleep at block 1535. This may consist of a timed period of inactivity—such as may be registered with the host OS 120—to give the destination VM 145 more time to power down. The logic flow 1500 may then loop back to block 1520.

The logic flow 1500 may return a warning that the migration application 110 is unable to determine migration status of the guest OS 150 at block 1540. The migration application 110 may proceed to restore the source VM 140 as with proceeding to block 1150 of FIG. 11 or may allow an administrator to determine how to proceed as an administrator may be able to, for example, view into the operation of guest OS 150 and determine that more time should or should not be allowed for the scripts to complete.

The logic flow 1500 may determine whether to keep a static MAC at block 1550. The schemes used by the source hypervisor 130 and destination hypervisor 135 may differ as to how they create MAC addresses for virtualized NICs. Maintaining MAC addresses generated by the source hypervisor 130 may result in eventual problems as the source hypervisor 130 may decide that, having lost control of guest OS 150 that the MAC address the source hypervisor 130 assigned to the source VM 140 for use by guest OS 150 are available again and assign those MAC addresses to a new VM. These problems may be avoided by allowing the destination hypervisor 135 to assign new MAC addresses to the virtualized NICs. Alternatively, some virtual machines may be, for example, recreations of real hardware so as to smoothly transition an operating system from running on real hardware to running on virtualized hardware. In these cases the MAC addresses may be guaranteed to remain unique and, as such, not need to be set to be assigned by the destination hypervisor 135. This may be of particular importance, even where the MAC addresses did not originally correspond to real hardware, where the applications running on the guest OS 150 make use of a static MAC address. If static MACs are to be kept the logic flow 1500 proceeds to block 1560. Otherwise, the logic flow 1500 proceeds to block 1555.

The logic flow 1500 may set MAC addresses to dynamic assignment by the destination hypervisor 135 at block 1555. The logic flow 1500 then proceeds to block 1560.

The logic flow 1500 may determine whether to start the destination VM 145 at block 1560. This may be a configuration option of the migration application 110. For example, an administrator may have decided to perform a test migration to confirm that the migration process may be performed without error, without an interest in bringing the destination VM 145 online at that time. If the destination VM 145 is to be started, the logic flow 1500 proceeds to block 1565. Otherwise, the logic flow 1500 proceeds to block 1590.

The logic flow 1500 may start the destination VM 145 at block 1565. This may comprise the migration application 110 sending a power-on command to the destination hypervisor 135. The logic flow 1500 then proceeds to block 1590.

The logic flow 1500 may continue to the next step in the overall process at block 1590. This may correspond to the transition of the overall logic flow 1100 out of block 1160 of FIG. 11.

The embodiments are not limited to this example.

Figure 16:
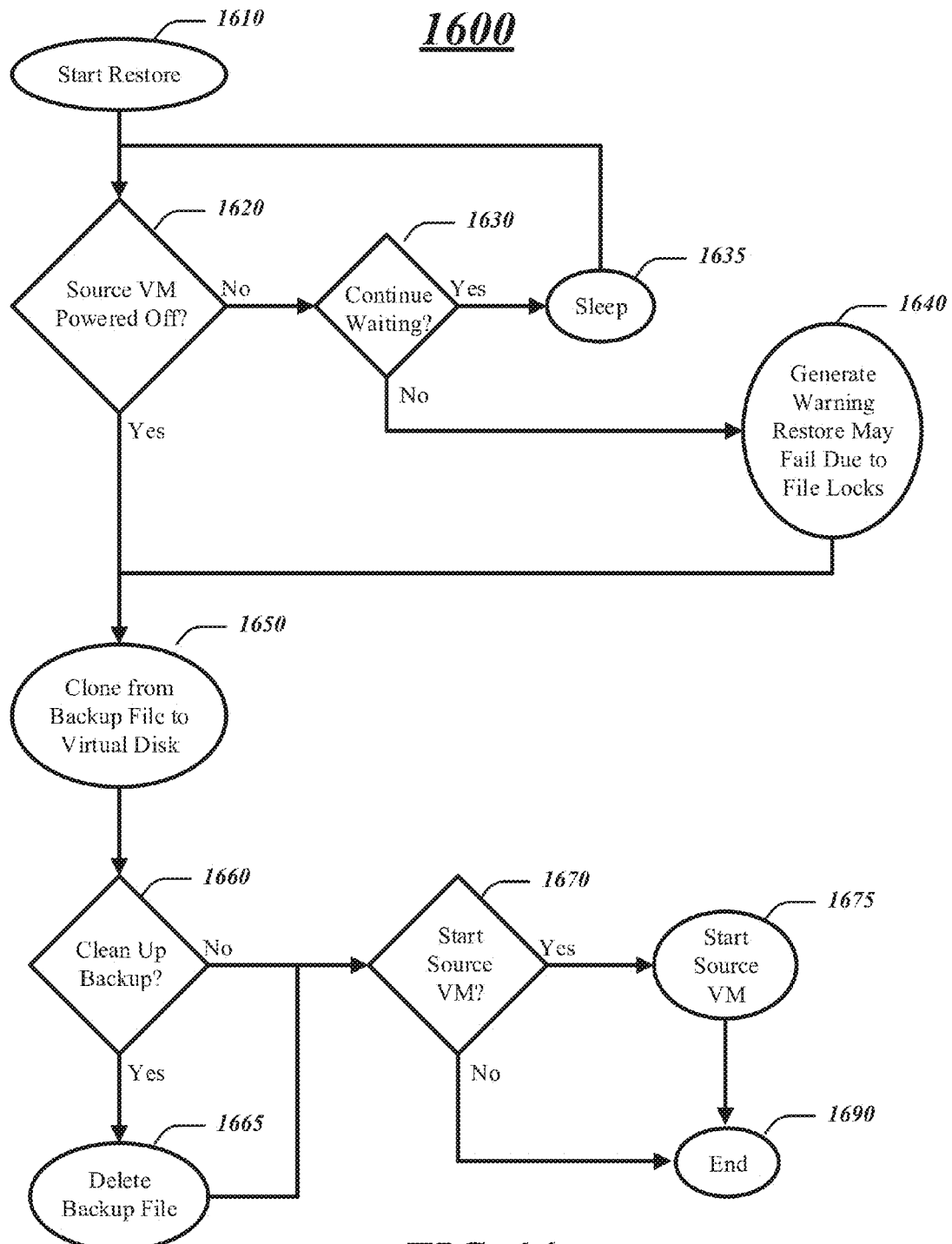
FIG. 16 illustrates an embodiment of a detailed logic flow for the restore stage of the overall logic flow of FIG. 11.

FIG. 16 illustrates one embodiment of a logic flow 1600. The logic flow 1600 may be representative of some or all of the operations executed by one or more embodiments described herein. The logic flow 1600 may be a detailed logic flow for the restore stage of the overall logic flow 1100 of FIG. 11.

In the illustrated embodiment shown in FIG. 16, the logic flow 1600 may begin at block 1610. This may correspond to the transition of the overall logic flow 1100 into block 1136 of FIG. 11. The logic flow then proceeds to block 1620.

The logic flow 1600 may determine whether the source VM 140 has powered off at block 1620. If the source VM 140 has powered off, the logic flow 1600 proceeds to block 1650. Otherwise, the logic flow 1600 proceeds to block 1630.

The logic flow 1600 may determine whether to continue waiting for the source VM 140 to power down at block 1630. If the migration application 110 is willing to continue waiting the logic flow 1600 may proceed to block 1635. If the limit of its willingness to wait has been reached the logic flow 1600 may proceed to block 1640.

The logic flow 1600 may have the migration application 110 sleep at block 1635. This may consist of a timed period of inactivity—such as may be registered with the host OS 120—to give the source VM 140 more time to power down. The logic flow 1600 may then loop back to block 1620.

The logic flow 1600 may return a warning that the restore may fail due to file locks at block 1640. The failure of the source VM 1620 to shut down may result in some of the files used by the source hypervisor 130 in generation the source VM 140 to still be locked and thereby interfere with the restoration of the source VM 140. The logic flow 1600 may then continue to block 1650.

The logic flow 1600 may clone from the backup file to the virtual disk to restore the source VM virtual disk 170. The logic flow 1600 then proceeds to block 1660.

The logic flow 1600 may determine whether to clean up the backup file at block 1660. This may be a configuration option of the migration application 110. Some administrators may choose to keep around the backup file in order to, for example, have a known good configuration of the source VM 140 during testing of the destination hypervisor 135. If clean up is to be performed the logic flow 1600 proceeds to block 1665. Otherwise, the logic flow 1600 proceeds to block 1670.

The logic flow 1600 may delete the backup file at block 1665. This may not result in the removal of any actual blocks from the file system 160 but instead simply the decrementing of a file reference counter on any of the virtual disk blocks 190 referenced by the backup file. The logic flow 1600 may then proceed to block 1670.

The logic flow 1600 may determine whether to start the source VM 140 at block 1670. This may be a configuration option of the migration application 110. For example, if the migration was a test migration, the destination VM 145 may not have been started at the decision point of block 1560 in FIG. 15 and instead the source VM 140 is restarted in order to resume operation of the guest OS 150 on top of source VM 140 provided by source hypervisor 130. If the source VM 140 is to be started again the logic flow 1600 proceeds to block 1675.

The logic flow 1600 may start the source VM 140 at block 1675. This may be performed by the migration application 110 sending a power-on command to the source hypervisor 130. The logic flow 1600 then proceeds to block 1690.

The logic flow 1600 may end at block 1690. This may correspond to the transition of the overall logic flow 1100 out of block 1136 of FIG. 11. As discussed with reference to block 1136 of FIG. 11, this may indicate that the migration application 110 has completed its task or may result in the migration application 110 continuing with the migration of other virtual machines.

The embodiments are not limited to this example.

Using one or more of the flowcharts described herein, FIGS. 17 and 18 below illustrate more specifically, operations executing the backup operation of the VM on the hypervisor and sub-file cloning of the virtual machine. FIG. 17 illustrates one embodiment of the backup operation of the VM described herein. The logic flow 1700 may be representative of some or all of the operations executed by one or more embodiments described herein. For example, the logic flow 1700 may be a detailed logic flow for the backup operations of the overall logic flow 1000 of FIG. 10 or logic flow 1200 of FIG. 12. In the illustrated embodiment shown in FIG. 17, the logic flow 1700 quiesces a virtual machine 140 at block 1702. The logic flow 1700 takes a hypervisor snapshot at block 1704. For example, a snapshot is take of source hypervisor 130. The logic flow 1700 clones all virtual disks of the source hypervisor 130 at block 1706. The logic flow 1700 then deletes the snapshot of the source hypervisor 130 at block 1708.

FIG. 18 illustrates one embodiment of sub-file cloning of a virtual machine. The logic flow 1800 may be representative of some or all of the operations executed by one or more embodiments described herein. In the illustrated embodiment shown in FIG. 18, the logic flow 1800 takes a volume-level snapshot at block 1802. The logic flow 1800 performs a sub-file cloning from a source virtual machine 140 to a destination virtual machine 145 at block 1804. The logic flow 1800 determines at block 1806 if the clone split is complete. If no, the logic flow 1800 continues to monitor and repeat block 1806 until the clone split is complete. If yes, the logic flow 1800 deletes the volume-level snapshot at block 1808.

Figure 19:
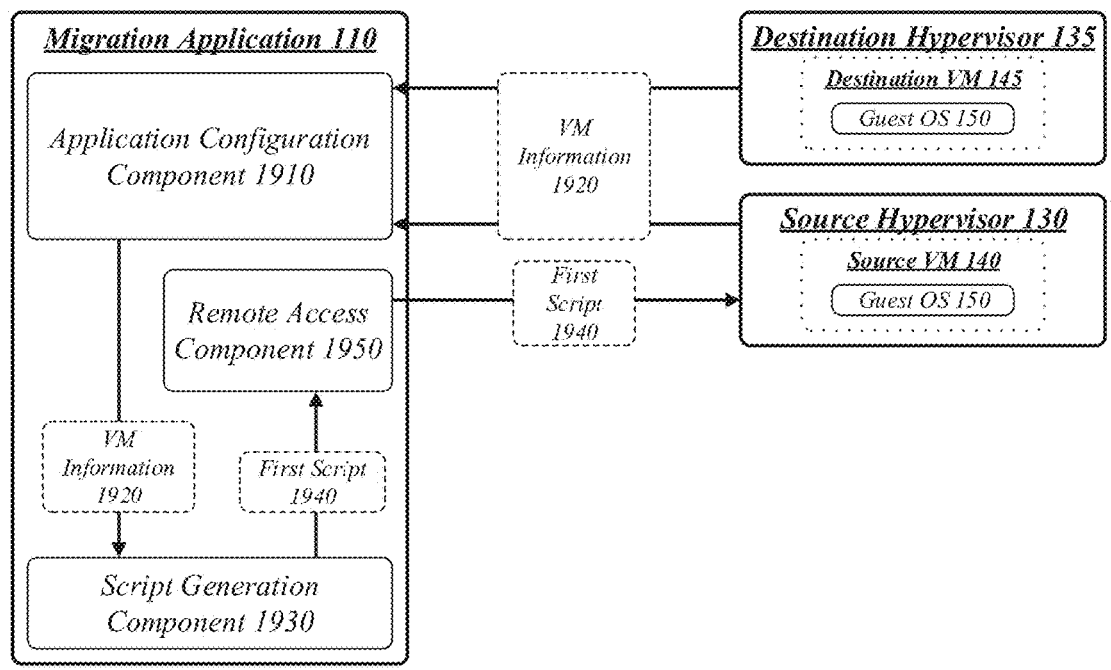
FIG. 19 illustrates a second embodiment of a virtual machine migration system.

FIG. 19 illustrates a second block diagram for the virtual machine migration system 100. In one embodiment, the virtual machine migration system 100 may comprise a computer-implemented system having a migration application 110 comprising one or more components. Although the virtual machine migration system 100 shown in FIG. 19 has a limited number of elements in a certain topology, it may be appreciated that the virtual machine migration system 100 may include more or less elements in alternate topologies as desired for a given implementation.

The system 100 may comprise the migration application 110. The migration application 110 may be generally arranged to oversee the deployment of one or more scripts to a guest OS 150 to migrate the guest OS 150 from a source VM 140 provided by a source hypervisor 130 to a destination VM 145 provided by a destination hypervisor 135. The migration application 110 may comprise an application configuration component 1910, script generation component 1930, and a remote access component 1950.

The application configuration component 1910 may be generally arranged to request VM information 1920 from the source hypervisor 130 and destination hypervisor 135. This may comprise use an API for the hypervisors 130, 135 to retrieve information relevant to the generation of scripts specific to the source hypervisor 130, destination hypervisor 135, the source VM 140, destination VM 145, and guest OS 150. The application configuration component 1910 may receive the VM information 1920 from the source hypervisor 130 and destination hypervisor 135 and pass the VM information 1920 to the script generation component 1930.

In some embodiments, the collecting of information about some or all of the source hypervisor 130, destination hypervisor 135, the source VM 140, destination VM 145, and guest OS 150 may be irrelevant to the generation of the migration scripts. As such, the application configuration component 1910 may only collect such information as relevant to that embodiment. In some embodiments, the migration scripts may be generated without the VM information 1920 being collected from the hypervisors 130, 135. In these embodiments, the particular hypervisors 130, 135 and guest OS 150 being used—for example, a product name for the hypervisors 130, 135 and guest OS 150—may be specified during a configuration of migration application 110 by an administrator of the virtual machine migration system 100.

The script generation component 1930 may be generally arranged to generate a first script 1940, the first script 1940 to migrate a guest OS 150 running on a source VM 140 to run on a destination VM 145. The source VM 140 may be provided by a source hypervisor 130 and the destination VM 145 may be provided by a destination hypervisor 135. The source hypervisor 130 and the destination hypervisor 135 may differ in hardware virtualization as to prevent the guest OS 150 from making full use of the destination VM 145 without reconfiguration. For instance, the guest OS 150 may be able to boot and run scripts on the destination VM 145 without reconfiguration, but be unable to access any or all of one or more networks provided by the destination VM 145 without reconfiguration by the virtual machine migration system 100. In general, the guest OS 150 being prevented from making full use of the destination VM 145 without reconfiguration may correspond to the guest OS 150 making use of one or more virtualized hardware resources of the source VM 140 that it is unable to make use of on the destination VM 145 without reconfiguration.

In some cases, the first script 1940 may have its execution within the guest OS 150 initiated by the remote access component 1950. In these cases, the first script 1940 may be part of a plurality of scripts, wherein all of the plurality of scripts are executed within the guest OS 150. Each of the plurality of scripts may be associated with a particular area of reconfiguration, such as network reconfiguration, tools reconfiguration, etc. However, in some cases, the guest OS 150 may not be accessible to automated commands by the migration application 110. In these cases, the script generation component 1930 may generate the first script 1940 as an offline script operative for human-initiated execution. The first script 1940 may be generated as an offline script in response to the remote access component 1950 determining that source VM 140 is inaccessible to automated commands. The offline script may contain all of the scripted activities that would otherwise be performed by the plurality of scripts into a single script, to ease the process for the human operator manually loading it into the guest OS 150 and initiating it.

The script generation component 1930 may generate the first script 1940 using templates configured into the migration application 110. For instance, the migration application 110 may store script elements for the performance of various migration tasks, which may be specific to any individual or combination of particular tasks, particular guest operating systems, particular source hypervisors, particular destination hypervisors, and particular options selected by an administrator of the virtual machine migration system 100. The script element may include templates variables for which values may be assigned based on any individual or combination of particular tasks, particular guest operating systems, particular source hypervisors, particular destination hypervisors, and particular options selected by an administrator of the virtual machine migration system 100. In general, any known technique for generating a script, including any known technique for generating scripts based on templates, may be used.

The remote access component 1950 may be generally arranged to command the guest OS 150 to execute the first script 1940 using at least one of a remote access API of the guest OS 150 or a remote administration API of a source hypervisor 130 for the source VM 140. A remote access API of the guest OS 150 may be provided by the guest OS 150 for remote administration of the guest OS 150. A remote administration API of a source hypervisor 130 may be provided by the source hypervisor 130 for remote access to the guest OS 150 by providing a bridge between the environment external to the source VM 140 and the guest OS 150 within it.

Where neither such API exists, or, alternatively, where a particular API relied on by an embodiment of the virtual machine migration system 100 does not exist, the remote access component 1950 may be operative to determine that that the source VM 140 is inaccessible to automated commands and report such to the script generation component 1930 so as to indicate that an offline script should be generated. In other cases, the use of an offline script may be specified by an administrator of the virtual machine migration system 100, with the script generation component 1930 producing the first script 1940 as an offline script in response to the specification by the administrator rather than in response to a determination by the remote access component 1950 that the source VM 140 is inaccessible to automated commands. Such configuration by the administrator may be performed even where the source VM 140 would be accessible to automated commands.

Figure 20:
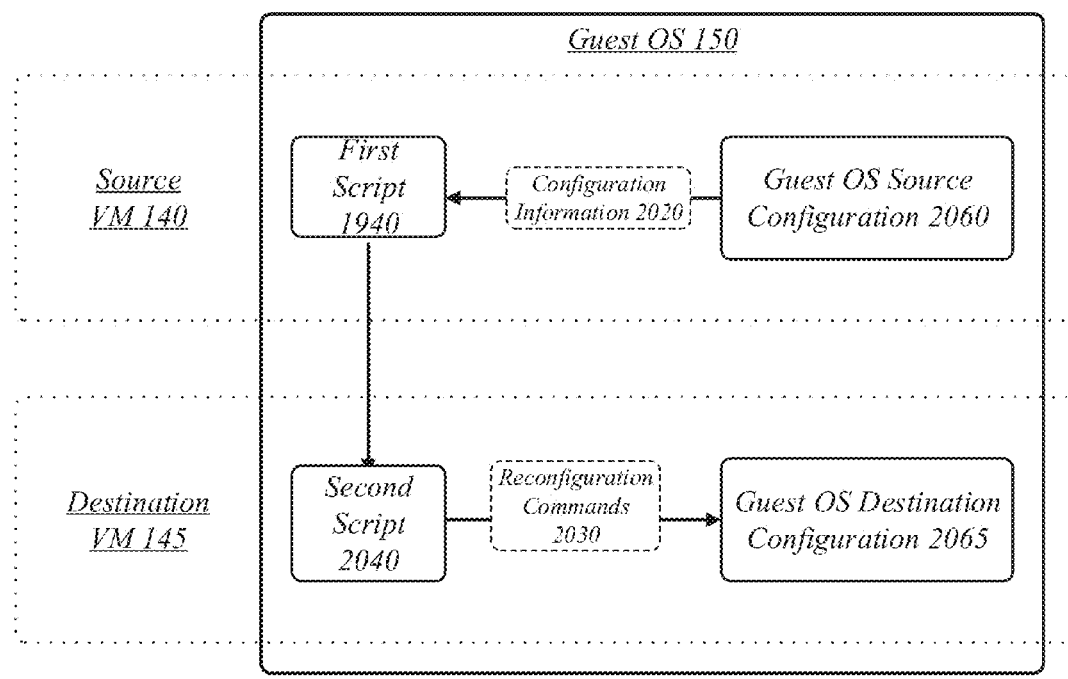
FIG. 20 illustrates an embodiment of a first and second script executing in the guest operating system for the virtual machine migration system.

FIG. 20 illustrates an embodiment of a first script 1940 and second script 2040 executing in the guest OS 150 for the virtual machine migration system 100.

The first script 1940 may be generally arranged to collect configuration information 2020 of the guest OS 150 based on the current guest OS source configuration 2060 while the guest OS 150 is running on the source VM 140. The first script 1940 may collect the configuration information 2020 by querying the guest OS 150, utilities of the guest OS 150, and configuration files of the guest OS 150.

The first script 1940 may generate a second script 2040 based on the collected configuration information 2060. The first script 1940 may generate the second script 2040 using templates configured into the first script 1940. For instance, the migration application 110 may store script elements for the performance of various migration tasks, which may be specific to any individual or combination of particular tasks, particular guest operating systems, particular source hypervisors, particular destination hypervisors, and particular options selected by an administrator of the virtual machine migration system 100. The script element may include templates variables for which values may be assigned based on any individual or combination of particular tasks, particular guest operating systems, particular source hypervisors, particular destination hypervisors, and particular options selected by an administrator of the virtual machine migration system 100. In general, any known technique for generating a script, including any known technique for generating scripts based on templates, may be used. The script elements relevant to the current migration may be made available to the first script 1940 by the script generation component 1930, which may include providing multiple potential elements that may be selected from by the first script 1940 according to the collected configuration information 2020.

The configuration information 2020 may be collected while the guest OS 150 is running on the source VM 140. Collecting the configuration information 2020 while the guest OS 150 is still running on the source VM 140 allows the collected configuration information 2020 to be read from the guest OS source configuration 2060 while it is operating correctly within the virtualized hardware environment provided by the source hypervisor 130.

The first script 1940 may configure the guest OS 150 to execute the second script 2040. The guest OS 150 may be configured for the execution of the second script 1940 to occur while the guest OS 150 is running on the destination VM 145. As the second script 1940 will be reconfiguring the guest OS 150 to properly run on the destination VM 145, this reconfiguration occurs while the guest OS 150 is running on virtualized hardware environment provided by the destination hypervisor 135. Because the virtualized hardware environment provided by the destination hypervisor 135 may differ from the virtualized hardware environment provided by the source hypervisor 130, the reconfiguration is best performed with access to the changes in environment presented by the new virtualized hardware environment of the destination VM 145 as the reconfiguration may be specific to the destination VM 145. The second script 2040 may reconfigure the guest OS 150 using scripting-based reconfiguration commands 2030 to create the guest OS destination configuration 2065. The reconfiguration commands 2030 may be encoded in the second script 2040 by the first script 1940 based on the configuration information 2020. In some embodiments, the second script 2040 may be part of a plurality of scripts generated by the first script 1940, wherein the plurality of scripts are executed within the guest OS 150 running on top of the destination VM 145 based on the first script 1940 configuring the guest OS 150 to execute them.

The first script 1940 may configure the guest OS 150 to execute the second script 2040 on a next booting up of the guest OS 150. The first script 1940 may perform this configuration while the guest OS 150 is running on the source VM 140, after the configuration information 2020 has been collected and the second script 2040 generated. The first script 1940 may then shut down the guest OS 150.

The remote access component 1950 may monitor the source hypervisor 130 to determine when the guest OS 150 has shut down and, accordingly, the source VM 140 has moved to a virtualized power-off state. The remote access component 1950 may monitor the source hypervisor 130 for the guest OS 150 shutting down in order to determine when the first script 1940 has completed its tasks and has made the guest OS 150 ready to boot on top the destination VM 145. As such, when the remote access component 1950 determines that the guest OS 150 has shut down on the source VM 140 it may then command the destination hypervisor 125 to boot up the guest OS 150 on the destination VM 145 in response.

In some cases, the guest OS 150 may fail to shut down when running on the source VM 140. As such, the migration application 110 may have a limited amount of time it is willing to wait for the first script 1940 to complete. When this time has expired the remote access component 1950 may instruct the source hypervisor 130 to force the shut down of the guest OS 150 by forcing the source VM 140 into a virtualized power-off state. While this risks leaving the guest OS 150 in an unsafe state, it may be preferable to allowing the guest OS 150 to indefinitely hang without shutting down. The migration application 110 may be configured to wait an amount of time estimated to be a sufficient amount of time for the first script 1940 to collect the configuration information 2020 and generate the second script 2040. Once the guest OS 150 has been forced to shut down, the remote access component 1950 may command the destination hypervisor 135 to boot up the guest OS 150 on top of the destination VM 145 in response.

In some cases, the configuration information 2020 collected may include a mapping between one or more network interfaces of the source VM 140 and media access control (MAC) addresses assigned to the one or more network interfaces of the source VM 140. The second script 2040 may reconfigure the guest OS 150 by creating associations between the guest OS 150 and one or more network interfaces of the destination VM 145 based on the mapping generated by the first script 1940. The associations created by be based on the mapping by virtue of the second script 2040 having been created by the first script 1940 using the mapping in order to reproduce the association between internal network interfaces of the guest OS 150 and the MAC addresses to which they were assigned in the destination VM 145 as they were in the source VM 140. This may serve to resolve any networking complications created by using different technologies for virtualizing a network interface or using a different naming scheme for the virtualized network interfaces.

FIG. 21 illustrates one embodiment of a logic flow 2100. The logic flow 2100 may be representative of some or all of the operations executed by one or more embodiments described herein.

In the illustrated embodiment shown in FIG. 21, the logic flow 2100 may . . . at block 2102.

The logic flow 2100 may execute a first script 1940 in a guest OS 150 running on a source VM 140, the first script 1940 collecting configuration information 2020 of the guest OS 150 at block 2104. The first script 1940 may be executed in the guest OS 150 using at least one of a remote access API of the guest OS 150 or a remote administration API of a source hypervisor 130 for the source VM 140. Alternatively, it may be determined that the source VM 140 is inaccessible to automated commands, with the first script 1940 generated as an offline script operative for human-initiated execution in response.

The source VM 140 may be provided by a source hypervisor 130, the destination VM 145 provided by a destination hypervisor 135, the source hypervisor 130 and destination hypervisor 135 differing in hardware virtualization as to prevent the guest OS 150 from making full use of the destination VM 135 without reconfiguration. In particular, the networking configuration of the guest OS 150 may be incompatible with the virtualized networking hardware presented to the guest OS 150 as part of the virtualized hardware environment of the destination VM 145.

The configuration information 2020 collected may comprise a NIC-to-MAC mapping between one or more network interfaces of the source VM 140 and media access control addresses assigned to the one or more network interfaces of the source VM 140. This mapping may allow the logic flow 2100 to recreate the associations between non-virtualized, physical NICs and the virtualized NICs of the virtualized hardware environment despite changes in how the virtualized hardware environment is created.

The logic flow 2100 may generate a second script 2040 based on the collected configuration information 2020 at block 2106. The first script 1940 may generate this second script 2040.

The logic flow 2100 may execute the second script 2040 in the guest OS 150 running on the destination VM 145, the second script 2040 reconfiguring the guest OS 150 to run on the destination VM 145 at block 2108. The second script 2040 may be executed by the first script 1940 configuring the guest OS 150 while its running on the source VM 140 to automatically execute the second script 2040 on a next booting up of the guest operating system. The first script 1940 may then shut down the guest OS 150. The guest OS 150 may be booted up on the destination VM 145 after being shut down.

The first script 1940 may configure the guest OS 150 to immediate boot after the shut down (e.g., a reboot), or may allow an external migration application 110 running without virtual machine mediation on the host OS 120 to boot the guest OS 150. This migration application 110 may act to have the next boot be on the destination VM 145 provided by the destination hypervisor 135 and may perform other tasks between the shut down of the guest OS 150 and its next boot to further the migration of the guest OS 150.

The second script 2040 may reconfigure the guest OS 150 by creating associations between the guest OS 150 and one or more network interfaces of the destination VM 135 based on the NIC-to-MAC mapping.

The embodiments are not limited to this example.

FIG. 22 illustrates a block diagram of a centralized system 2200. The centralized system 2200 may implement some or all of the structure and/or operations for the virtual machine migration system 100 in a single computing entity, such as entirely within a single device 2220.

The device 2220 may comprise any electronic device capable of receiving, processing, and sending information for the system 100. Examples of an electronic device may include without limitation an ultra-mobile device, a mobile device, a personal digital assistant (PDA), a mobile computing device, a smart phone, a telephone, a digital telephone, a cellular telephone, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 2220 may execute processing operations or logic for the system 100 using a processing component 2230. The processing component 2230 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 2220 may execute communications operations or logic for the system 100 using communications component 2240. The communications component 2240 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 2240 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 2212 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 2220 may communicate with a device 2210 over a communications media 2212 using communications signals 2214 via the communications component 2240. The device 2210 may be internal or external to the device 2220 as desired for a given implementation.

The device 2220 may host the host OS 120, the host 120 running the migration application 110, source hypervisor 130, and destination hypervisor 135, with the source VM 140 and destination VM 145 provided by the respective hypervisors 130, 135. The device 2220 may also host the file system 160 storing the virtual disk blocks 190 for the source VM virtual disk 170 and destination VM virtual disk 175. The migration application 110 may perform the migration of the guest OS 150 from the source VM 140 to the destination VM 145 on the device 2220.

The device 2210 may provide support or control for the migration operations of the migration application 110 and/or the hosting operations of the device 2220 and host 120. The device 2210 may comprise an external device externally controlling the device 2220, such as where device 2210 is a server device hosting the guest OS 150 and the device 2210 is a client administrator device used to administrate device 2210 and initiate the migration using migration application 110. In some of these cases, the migration application 110 may instead be hosted on the device 2210 with the remainder of the virtual machine migration system 100 hosted on the device 2220. Alternatively, the device 2210 may have hosted the migration application 110 as a distribution repository, with the migration application 110 downloaded to the device 2220 from the device 2210.

Figure 23:
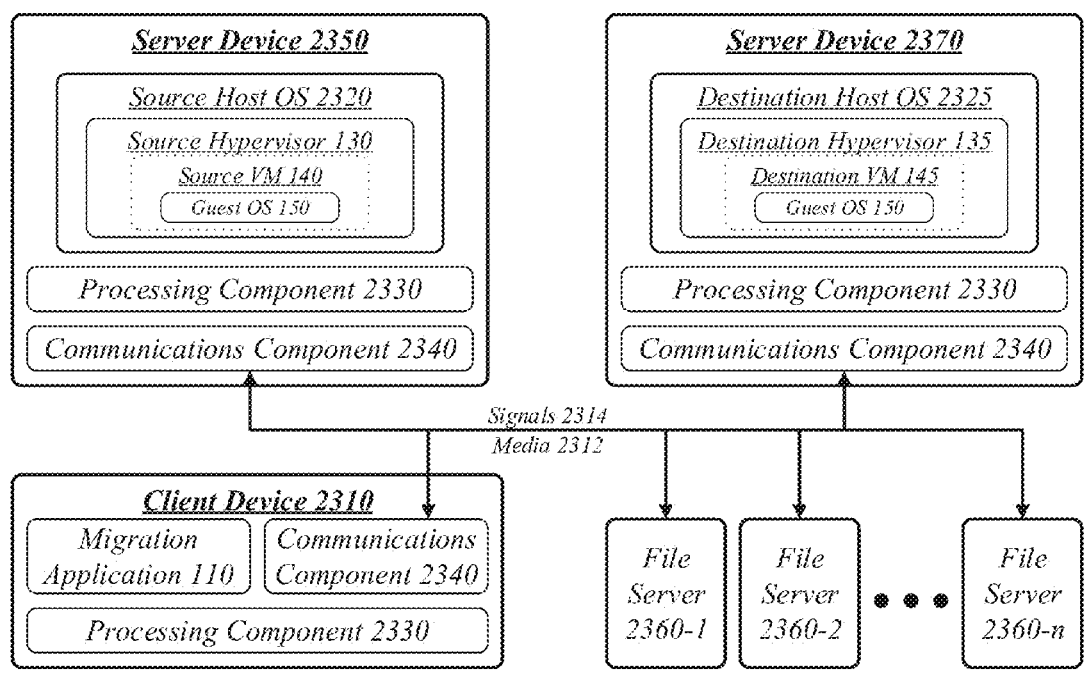
FIG. 23 illustrates an embodiment of a distributed system for the virtual machine migration system of FIG. 1.

FIG. 23 illustrates a block diagram of a distributed system 2300. The distributed system 2300 may distribute portions of the structure and/or operations for the virtual machine migration system 100 across multiple computing entities. Examples of distributed system 2300 may include without limitation a client-server architecture, a S-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 2300 may comprise a client device 2310 and server devices 2350 and 2370. In general, the client device 2310 and the server devices 2350 and 2370 may be the same or similar to the client device 2220 as described with reference to FIG. 22. For instance, the client device 2310 and the server devices 2350 and 2370 may each comprise a processing component 2330 and a communications component 2340 which are the same or similar to the processing component 1130 and the communications component 2240, respectively, as described with reference to FIG. 22. In another example, the devices 2310, 2350, and 2370 may communicate over a communications media 2312 using communications signals 2314 via the communications components 2340. The distributed system 2300 may comprise a distributed file system implemented by distributed file servers 2360 including file servers 2360-1 through 2360-n, where the value of n may vary in different embodiments and implementations. The local storage of the client device 2310 and server devices 2350, 2370 may work in conjunction with the file servers 2360 in the operation of the distributed file system, such as by providing a local cache for the distributed file system primarily hosted on the file servers 2360 so as to reduce latency and network bandwidth usage for the client device 2310 and server devices 2350, 2370.

The client device 2310 may comprise or employ one or more client programs that operate to perform various methodologies in accordance with the described embodiments. In one embodiment, for example, the client device 2310 may implement the migration application 110 initiating, managing, and monitoring the migration of the guest OS 150 from the source VM 140 to the destination VM 145. The client device 2310 may use signals 2314 to interact with the source hypervisor 130, destination hypervisor 135 and/or guest OS 150 while they are running on each of the source VM 140 and destination VM 145, and file servers 2360.

The server devices 2350, 2370 may comprise or employ one or more server programs that operate to perform various methodologies in accordance with the described embodiments. In one embodiment, for example, the server device 2350 may implement a source host OS 2320 hosting the source hypervisor 130 providing the source VM 140. The server device 2350 may use signals 2314 to receive control signals from the migration application 110 on client device 2310 and to transmit configuration and status information to the migration application 110. The server device 2350 may use signals 2314 communicate with the file servers 2360 both for the providing of source VM 140 and for the migration of guest OS 150 from the source VM 140 to the destination VM 145.

The server device 2370 may implement a destination host OS 2325 hosting the destination hypervisor 135 providing the destination VM 145. The server device 2370 may use signals 2314 to receive control signals from the migration application 110 on client device 2310 and to transmit configuration and status information to the migration application 110. The server device 2370 may use signals 2314 communicate with the file servers 2360 both for the providing of destination VM 145 and for the migration of guest OS 150 to the destination VM 145 to the source VM 140.

In some embodiments, the same server device may implement both the source hypervisor 130 and the destination hypervisor 135. In these embodiments, the migration application 110 hosted on a client device 2310 may perform the migration of the guest OS 150 from the source VM 140 to the destination VM 145 on this single server device, in conjunction with migration operations performed using the distributed file system.

Figure 24:
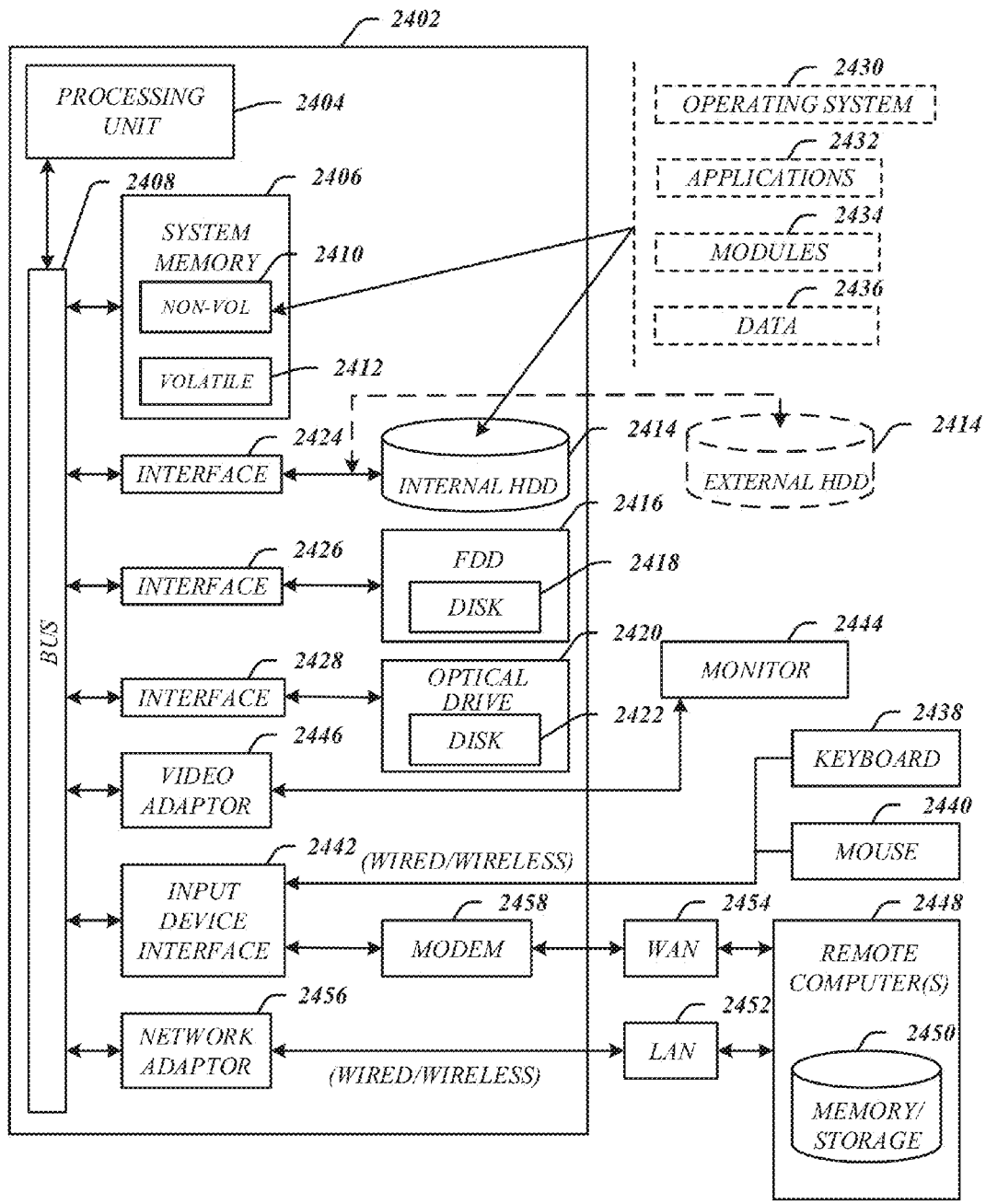
FIG. 24 illustrates an embodiment of a computing architecture.

FIG. 24 illustrates an embodiment of an exemplary computing architecture 1300 suitable for implementing various embodiments as previously described. In one embodiment, the computing architecture 2400 may comprise or be implemented as part of an electronic device. Examples of an electronic device may include those described with reference to FIG. 11, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 2400. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 2400 includes various common computing elements, such as one or more processors, multi-core processors, co-processors, memory units, chip-sets, controllers, peripherals, interfaces, oscillators, timing devices, video cards, audio cards, multimedia input/output (I/O) components, power supplies, and so forth. The embodiments, however, are not limited to implementation by the computing architecture 11200.

As shown in FIG. 24, the computing architecture 2400 comprises a processing unit 2404, a system memory 2406 and a system bus 2408. The processing unit 2404 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 2404.

The system bus 2408 provides an interface for system components including, but not limited to, the system memory 2406 to the processing unit 2404. The system bus 2408 can be any of several types of bus structure that may further interconnect to a memory bus (with or without a memory controller), a peripheral bus, and a local bus using any of a variety of commercially available bus architectures. Interface adapters may connect to the system bus 2408 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 11200 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 2406 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 24, the system memory 2406 can include non-volatile memory 2410 and/or volatile memory 2412. A basic input/output system (BIOS) can be stored in the non-volatile memory 2410.

The computer 2402 may include various types of computer-readable storage media in the form of one or more lower speed memory units, including an internal (or external) hard disk drive (HDD) 2414, a magnetic floppy disk drive (FDD) 2416 to read from or write to a removable magnetic disk 2418, and an optical disk drive 2420 to read from or write to a removable optical disk 2422 (e.g., a CD-ROM or DVD). The HDD 2414, FDD 2416 and optical disk drive 2420 can be connected to the system bus 2408 by a HDD interface 2424, an FDD interface 2426 and an optical drive interface 2428, respectively. The HDD interface 2424 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 2410, 2412, including an operating system 2430, one or more application programs 2432, other program modules 2434, and program data 2436. In one embodiment, the one or more application programs 2432, other program modules 2434, and program data 2436 can include, for example, the various applications and/or components of the system 100.

A user can enter commands and information into the computer 2402 through one or more wire/wireless input devices, for example, a keyboard 2438 and a pointing device, such as a mouse 2440. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 2404 through an input device interface 2442 that is coupled to the system bus 2408, but can be connected by other interfaces such as a parallel port, IEEE 1394 serial port, a game port, a USB port, an IR interface, and so forth.

A monitor 2444 or other type of display device is also connected to the system bus 2408 via an interface, such as a video adaptor 2446. The monitor 2444 may be internal or external to the computer 2402. In addition to the monitor 2444, a computer typically includes other peripheral output devices, such as speakers, printers, and so forth.

The computer 2402 may operate in a networked environment using logical connections via wire and/or wireless communications to one or more remote computers, such as a remote computer 2448. The remote computer 2448 can be a workstation, a server computer, a router, a personal computer, portable computer, microprocessor-based entertainment appliance, a peer device or other common network node, and typically includes many or all of the elements described relative to the computer 2402, although, for purposes of brevity, only a memory/storage device 2450 is illustrated. The logical connections depicted include wire/wireless connectivity to a local area network (LAN) 2452 and/or larger networks, for example, a wide area network (WAN) 2454. Such LAN and WAN networking environments are commonplace in offices and companies, and facilitate enterprise-wide computer networks, such as intranets, all of which may connect to a global communications network, for example, the Internet.

When used in a LAN networking environment, the computer 2402 is connected to the LAN 2452 through a wire and/or wireless communication network interface or adaptor 2456. The adaptor 2456 can facilitate wire and/or wireless communications to the LAN 2452, which may also include a wireless access point disposed thereon for communicating with the wireless functionality of the adaptor 2456.

When used in a WAN networking environment, the computer 2402 can include a modem 2458, or is connected to a communications server on the WAN 2454, or has other means for establishing communications over the WAN 2454, such as by way of the Internet. The modem 2458, which can be internal or external and a wire and/or wireless device, connects to the system bus 2408 via the input device interface 2442. In a networked environment, program modules depicted relative to the computer 2402, or portions thereof, can be stored in the remote memory/storage device 2450. It will be appreciated that the network connections shown are exemplary and other means of establishing a communications link between the computers can be used.

The computer 2402 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 25:
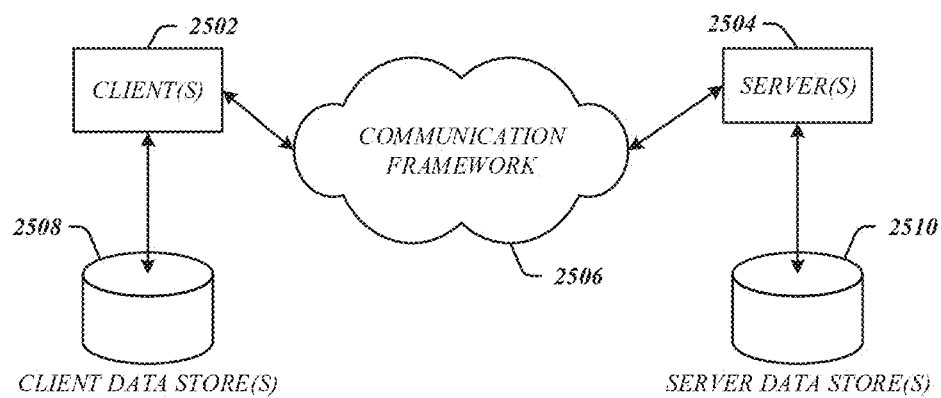
FIG. 25 illustrates an embodiment of a communications architecture.

FIG. 25 illustrates a block diagram of an exemplary communications architecture 2500 suitable for implementing various embodiments as previously described. The communications architecture 2500 includes various common communications elements, such as a transmitter, receiver, transceiver, radio, network interface, baseband processor, antenna, amplifiers, filters, power supplies, and so forth. The embodiments, however, are not limited to implementation by the communications architecture 2500.

As shown in FIG. 25, the communications architecture 2500 comprises includes one or more clients 2502 and servers 2504. The clients 2502 may implement the client device 910. The servers 2504 may implement the server devices 2350/2370. The clients 2502 and the servers 2504 are operatively connected to one or more respective client data stores 2508 and server data stores 2510 that can be employed to store information local to the respective clients 2502 and servers 2504, such as cookies and/or associated contextual information.

The clients 2502 and the servers 2504 may communicate information between each other using a communication framework 2506. The communications framework 2506 may implement any well-known communications techniques and protocols. The communications framework 2506 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 2506 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 2502 and the servers 2504. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
   validating by a universal application programming interface (API) a source virtual machine (VM) of a source hypervisor having a first platform, for migrating the source VM to a destination hypervisor with a second platform different from the first platform;
   generating a clone of the source VM, prior to migration, by:
      creating an empty data object in a destination logical storage unit of the destination hypervisor; and
      mapping a source block range used by the source VM to store data to a destination block range of the empty data object without having to create a physical copy of source VM data;
   migrating the source VM to the destination hypervisor using the clone;
   reconfiguring by the API a network interface of the source VM for use by a destination VM at the destination hypervisor; and converting by the API, prior to initializing the destination VM, a virtual disk used by the source VM from a source format to a destination format with same storage blocks used to store VM data before and after migration of the source VM;
   wherein the source VM is migrated to the destination hypervisor by reading meta-data of the source VM; creating an empty destination VM and meta-data on the destination hypervisor according to specification of the destination hypervisor; and creating at the empty destination VM, the clone of the source VM on the hypervisor.

2. The method of claim 1 further comprising:
   preserving the source VM on the hypervisor while migrating the VM onto the destination hypervisor; and
   enabling co-existence of the source VM and the destination VM that allows for independent control of the source VM and the destination VM.

3. The method of claim 2, further comprising: executing both a backup operation of the source VM on the source hypervisor and an automatic disaster recovery operation for protecting the source VM from the destination VM.

4. The method of claim 1, further comprising:
   collecting and preserving a plurality of credential information and configuration information relating to the network interface and the virtual disk for reconfiguring the network interface and the virtual disk;
   collecting and preserving network settings of a guest operating software (OS) of the source VM prior to the migration; and
   attaching a number of network adapters, which are preserved from the source VM on the hypervisor, onto the destination VM.

5. The method of claim 1, further comprising: translating VM operations of the source VM to the destination VM for automating VM mapping.

6. The method of claim 1, further comprising:
   collecting and preserving drive letter mapping of the source VM;
   applying the drive letter mapping of the source VM collected from the source hypervisor to the destination VM;
   removing at least one network interface controller from the source hypervisor; and
   recreating the at least one network interface controller onto the destination hypervisor.

7. The method of claim 1, further comprising performing a series of validation operations upon completion of migrating the source VM to the destination VM.

8. At least one non-transitory computer-readable storage medium comprising instructions that, when executed, cause a system to:
   validate by a universal application programming interface (API) a source virtual machine (VM) of a source hypervisor having a first platform, for migrating the source VM to a destination hypervisor with a second platform different from the first platform;
   generate a clone of the source VM, prior to migration, by:
      create an empty data object in a destination logical storage unit of the destination hypervisor; and
      map a source block range used by the source VM to store data to a destination block range of the empty data object without having to create a physical copy of source VM data;
   migrate the source VM to the destination hypervisor using the clone;

reconfigure by the API a network interface of the source VM for use by a destination VM at the destination hypervisor; and convert by the API, prior to initializing the destination VM, a virtual disk used by the source VM from a source format to a destination format with same storage blocks used to store VM data before and after migration of the source VM;

wherein the source VM is migrated to the destination hypervisor by reading meta-data of the source VM; creating an empty destination VM and meta-data on the destination hypervisor according to specification of the destination hypervisor; and creating at the empty destination VM, the clone of the source VM on the hypervisor.

9. The computer-readable storage medium of claim 8, comprising further instructions that, when executed, causes a system to:

preserve the source VM on the source hypervisor while migrating the source VM onto the destination hypervisor and enabling co-existence of the source VM and the destination VM; that allows for independent control of the source VM and the destination VM and execute both a backup operation of the source VM on the source hypervisor and an automatic disaster recovery operation for protecting the source VM preserved on the source hypervisor from the destination VM.

10. The computer-readable storage medium of claim 8, comprising further instructions that, when executed, causes a system to:

collect and preserve a plurality of credential information and configuration information relating to the network interface and the virtual disk for reconfiguring the network interface and the virtual disk of the source VM;

collect and preserve network settings of a guest operating software (OS) of the source VM prior to the migration; and attach a number of network adapters, which are preserved from the source VM onto the destination VM.

11. The computer-readable storage medium of claim 8, comprising further instructions that, when executed, causes a system to:

translate source VM operations of the source VM onto the destination VM for automating VM mapping.

12. The computer-readable storage medium of claim 8, comprising further instructions that, when executed, causes a system to:

collect and preserve drive letter mapping of the source VM; and apply the drive letter mapping of the source VM collected from the source hypervisor onto the destination VM;

remove at least one network interface controller from the source hypervisor;

recreate the at least one network interface controller onto the destination hypervisor; and perform a series of validation operations prior to and upon completion of migrating the source VM onto the destination hypervisor.

13. A system, comprising:

a memory containing machine readable medium comprising machine executable code having stored thereon instructions; and a processor coupled to the memory to execute the machine executable code to:

validate by a universal application programming interface (API) a source virtual machine (VM) of a source hypervisor having a first platform, for migrating the source VM to a destination hypervisor with a second platform different from the first platform;

generate a clone of the source VM, prior to migration, by:
creating an empty data object in a destination logical storage unit of the destination hypervisor; and
map a source block range used by the source VM to store data to a destination block range of the empty data object without having to create a physical copy of source VM data;

migrate the source VM to the destination hypervisor using the clone;

reconfigure by the API a network interface of the source VM for use by a destination VM at the destination hypervisor; and convert by the API, prior to initializing the destination VM, a virtual disk used by the source VM from a source format to a destination format with same storage blocks used to store VM data before and after migration of the source VM;

wherein the source VM is migrated to the destination hypervisor by reading meta-data of the source VM; creating an empty destination VM and meta-data on the destination hypervisor according to specification of the destination hypervisor; and creating at the empty destination VM, the clone of the source VM on the hypervisor.

14. The system of claim 13, comprising further instructions that, when executed, further causes the processor to:

preserve the source VM on the source hypervisor while migrating the source VM onto the destination hypervisor; and enabling co-existence of the source VM and the destination VM; that allows for independent control of the source VM and the destination VM; and execute both a backup operation of the source VM on the source hypervisor and an automatic disaster recovery operation for protecting the source VM preserved on the source hypervisor from the destination VM.

15. The system of claim 13, comprising further instructions that, when executed, further causes the processor to:

collect and preserve a plurality of credential information and configuration information relating to the network interface and the virtual disk reconfiguring the network interface and the virtual disk of the source VM;

collect and preserve network settings of a guest operating software (OS) of the source VM prior to the migration; and attach a number of network adapters, which are preserved from the source VM onto the destination VM.

16. The system of claim 13, comprising further instructions that, when executed, further causes the processor to:

translate source VM operations of the source VM onto the destination VM for automating VM mapping.

17. The system of claim 13, comprising further instructions that, when executed, further causes the processor to:

collect and preserve drive letter mapping of the source VM; and apply the drive letter mapping of the source VM collected from the source hypervisor onto the destination VM;

remove at least one network interface controller from the source hypervisor;

recreate the at least one network interface controller onto the destination hypervisor; and perform a series of validation operations prior to and upon completion of migrating the source VM onto the destination hypervisor.

* * * * *